(12) United States Patent
Mai et al.

(10) Patent No.: US 9,311,537 B2
(45) Date of Patent: Apr. 12, 2016

(54) METHOD, APPARATUS AND SYSTEM FOR DETECTING A SUPPORTING SURFACE REGION IN AN IMAGE

(71) Applicant: CANON KABUSHIKI KAISHA, Tokyo (JP)

(72) Inventors: Fei Mai, Parramatta (AU); Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/065,197

(22) Filed: Oct. 28, 2013

(65) Prior Publication Data

US 2014/0119604 A1 May 1, 2014

(30) Foreign Application Priority Data

Oct. 30, 2012 (AU) ................................ 2012244276

(51) Int. Cl.
*G06K 9/00* (2006.01)
*G06T 7/00* (2006.01)
(52) U.S. Cl.
CPC .......... *G06K 9/00624* (2013.01); *G06T 7/0081* (2013.01)
(58) Field of Classification Search
None
See application file for complete search history.

(56) References Cited

U.S. PATENT DOCUMENTS

| 5,586,160 | A | 12/1996 | Mascio |
| 7,751,589 | B2 | 7/2010 | Bovyrin et al. |
| 8,374,440 | B2 | 2/2013 | Vendrig et al. |
| 2004/0264806 | A1 | 12/2004 | Herley |
| 2009/0312985 | A1 | 12/2009 | Eliazar |
| 2010/0306200 | A1* | 12/2010 | Frank et al. .................... 707/741 |
| 2011/0181589 | A1 | 7/2011 | Quan et al. |
| 2012/0330447 | A1* | 12/2012 | Gerlach et al. .................. 700/95 |
| 2013/0079990 | A1* | 3/2013 | Fritsch et al. ................... 701/41 |
| 2013/0156314 | A1 | 6/2013 | Pham |

FOREIGN PATENT DOCUMENTS

| AU | 2006252252 B2 | 7/2008 |
| AU | 2008200967 B2 | 9/2009 |

(Continued)

OTHER PUBLICATIONS

Dahlkamp, Hendrik, Adrian Kaehler, David Stavens, Sebastian Thrun, and Gary Bradski. "Self-supervised Monocular Road Detection in Desert Terrain." Proceedings of Robotics: Science and Systems II. Aug. 16-19, 2006, Philadelphia, PA. Cambridge, MA: MIT Press, 2007.

(Continued)

*Primary Examiner* — Stephen R Koziol
*Assistant Examiner* — Amandeep Saini
(74) *Attorney, Agent, or Firm* — Canon U.S.A., Inc. IP Division

(57) ABSTRACT

A method of detecting a supporting surface region in an image captured by a camera is disclosed. An object in the image is detected. One or more regions of the image in which a lower part of the detected object exists are determined. A degree of confidence for each of the regions is determined. The degree of confidence indicates likelihood of a corresponding region being a supporting surface region. One or more of the regions are selected based on each corresponding degree of confidence. Similarity of other regions in the image to at least one of the selected regions is determined. The supporting surface region is detected based on the determined similarity.

16 Claims, 11 Drawing Sheets

(56) References Cited

FOREIGN PATENT DOCUMENTS

| AU | 2011265383 A1 | 7/2013 |
|---|---|---|
| WO | 2009/105812 A1 | 9/2009 |

OTHER PUBLICATIONS

Rother, Diego, Kedar A. Patwardhan, and Guillermo Sapiro. "What Can Casual Walkers Tell Us About A 3D Scene?" 11th IEEE International Conference on Computer Vision. Oct. 14-20, 2007, Rio de Janeiro, Brazil. IEEE, 2007.

"Kronecker delta." Wikipedia: The Free Encyclopedia. Wikimedia Foundation, Inc. Aug. 19, 2013. Web. Oct. 24, 2013. <http://en.wikipedia.org/wiki/Kronecker_delta>.

"Earth mover's distance." Wikipedia: The Free Encyclopedia. Wikimedia Foundation, Inc. Aug. 19, 2013. Web. Oct. 24, 2013. <http://en.wikipedia.org/wiki/Earth_mover%27s_distance>.

"Chronia key." Wikipedia: The Free Encyclopedia. Wikimedia Foundation, Inc. Sep. 16, 2013. Web. Oct. 24, 2013. <http://en.wikipedia.org/wiki/Chroma_key>.

"Kalman filter." Wikipedia: The Free Encyclopedia. Wikimedia Foundation, Inc. Oct. 23, 2013. Web. Oct. 24, 2013. <http://en.wikipedia.org/wiki/Kalman_filter>.

"Singular value decomposition." Wikipedia: The Free Encyclopedia. Wikimedia Foundation, Inc. Oct. 17, 2013. Web. Oct. 24, 2013. <http://en.wikipedia.org/wiki/Singular_value_decomposition>.

Chen, Bingwen, Wenwei Wang, and Qianqing Qin. "Robust multistage approach for the detection of moving target from infrared imagery." Optical Engineering. 51.6 (2012): 067006-1-9.

"Cross-correlation." Wikipedia: The Free Encyclopedia. Wikimedia Foundation, Inc. Oct. 13, 2013. Web. Oct. 24, 2013. <http://en.wikipedia.org/wiki/Cross-correlation>.

* cited by examiner

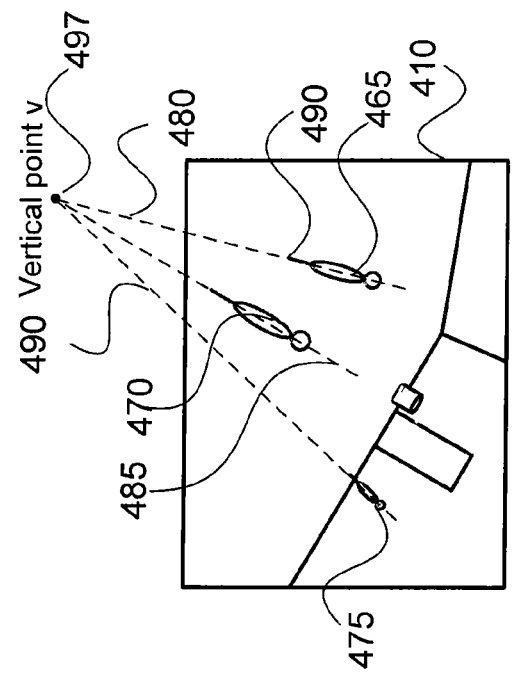
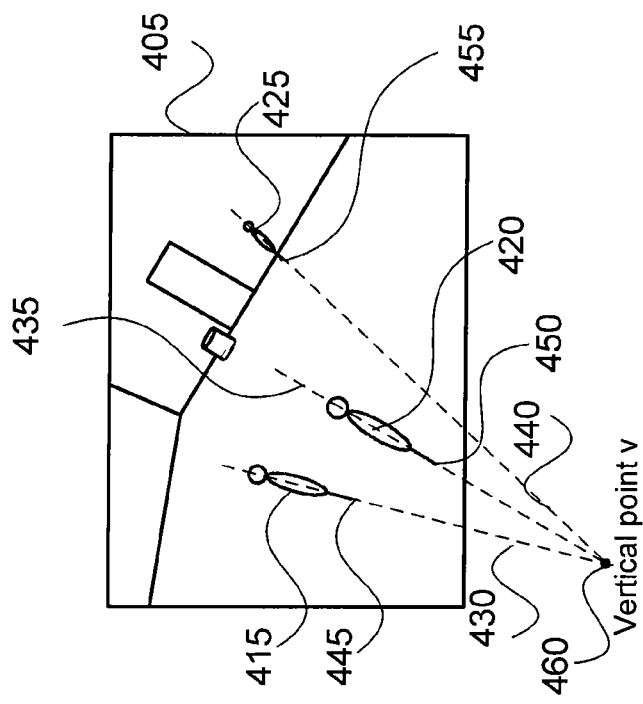
Fig. 4B
Fig. 4A

METHOD, APPARATUS AND SYSTEM FOR DETECTING A SUPPORTING SURFACE REGION IN AN IMAGE

REFERENCE TO RELATED PATENT APPLICATION(S)

This application claims the benefit under 35 U.S.C. §119 of the filing date of Australian Patent Application No. 2012244276, filed 30 Oct. 2012, hereby incorporated by reference in its entirety as if fully set forth herein.

FIELD OF INVENTION

The present disclosure relates generally to video processing and, in particular, to a method, apparatus and system for detecting a floor region (or supporting surface region) in an image captured by a static camera. The present disclosure also relates to a computer program product including a computer readable medium having recorded thereon a computer program for detecting a floor region (or supporting surface region) in an image.

DESCRIPTION OF BACKGROUND ART

The connection between three dimensional (3D) structure and image understanding is an important and long running theme in computer vision, largely motivated by models of human perception from computational neuroscience, including Man's 2.5D sketch. Geometric cues, whether arising from direct 3D reconstruction or low-level geometric reasoning, benefit a range of computer vision problems including tracking, object detection and visual saliency prediction.

One approach of single-view scene reconstruction assigns ordinal depth to a static image segmentation based on foreground occlusions, by 'pushing' occluded regions to lower layers and 'popping' occluding regions to higher layers. However, sensitivity to initial segmentation and target path makes such an approach brittle. Another approach adopts a more robust minimum description length optimization for depth layer assignment based on the assumption that persistent edges of foreground targets coincide with occlusion boundaries.

Another approach builds a simple three-layer model that segments scenes into static background, moving targets and static foreground occlusions. Evidence for occlusions follows from two assumptions: occlusions result in persistent foreground edges perpendicular to the direction of motion, and occlusion edges never appear inside foreground regions. The simple three-layer model approach is restricted to relatively simple scenes (e.g., scenes in which a person walks behind but never in front of an occluding object). Another approach additionally assumes foreground regions change rapidly in an area of an image during occlusion (e.g., when a person disappears behind an occluding object). The simple three-layer model approach and the approach which assumes the rapid change of foreground regions do not require static occlusion boundaries to coincide with intensity edges, and have the advantage of avoiding over-segmentation. However, neither the simple three-layer model approach nor the rapid change approach detects horizontal occlusion boundaries parallel to target motion.

Moving targets have been previously exploited to segment floor regions. One approach analyses moving people to recover camera calibration, floor segmentation and ground plane parameters in a static scene. The floor segmentation approach models floor appearance based on seed pixels underneath detected target footprints. The floor segment is constructed as a connected region of pixels within a threshold colour distance from the seeds. Another approach for detecting floor regions proposes a similar model to detect floor regions by iteratively growing a floor region around seed pixels. Both approaches work well in simple scenes with homogeneous floor appearance and sufficiently distributed footprints. However, neither approach considers the impact of partially occluded targets with no visible footprint, or the impact of occlusions that divide the floor into disconnected segments.

Another approach for detecting floor regions moves beyond simple foreground shape analysis by detecting human actions to probe "sittable" and "walkable" surfaces of a scene, which are subsequently used to infer single-view 3D structure. Such an approach relies heavily on single-view human pose estimation, which remains an open and challenging problem.

SUMMARY OF THE INVENTION

It is an object of the present invention to substantially overcome, or at least ameliorate, one or more disadvantages of existing arrangements.

According to one aspect of the present disclosure there is provided a method of detecting a supporting surface region in an image captured by a camera, said method comprising:
 detecting an object in the image;
 determining one or more regions of the image in which a lower part of the detected object exists;
 determining a degree of confidence for each of the regions, the degree of confidence indicating likelihood of a corresponding region being a supporting surface region;
 selecting one or more of the regions based on each corresponding degree of confidence;
 determining similarity of other regions in the image to at least one of the selected regions; and
 detecting the supporting surface region based on the determined similarity.

According to another aspect of the present disclosure there is provided an apparatus for detecting a supporting surface region in an image captured by a camera, said apparatus comprising:
 a processor; and
 a memory storing instructions that, when executed by the processor, cause the apparatus to:
  detect an object in the image,
  determine one or more regions of the image in which a lower part of the detected object exists,
  determine a degree of confidence for each of the regions, the degree of confidence indicating likelihood of a corresponding region being a supporting surface region,
  select one or more of the regions based on each corresponding degree of confidence,
  determine similarity of other regions in the image to at least one of the selected regions, and
  detect the supporting surface region based on the determined similarity.

According to still another aspect of the present disclosure there is provided a non-transitory computer-readable storage medium having recorded thereon a computer program for detecting a supporting surface region in an image captured by a camera that, said program comprising:
 code for detecting an object in the image;
 code for determining one or more regions of the image in which a lower part of the detected object exists;

code for determining a degree of confidence for each of the regions, the degree of confidence indicating likelihood of a corresponding region being a supporting surface region;

code for selecting one or more of the regions based on each corresponding degree of confidence;

code for determining similarity of other regions in the image to at least one of the selected regions; and code for detecting the supporting surface region based on the determined similarity.

According to still another aspect of the present disclosure there is provided a system for detecting a supporting surface region in an image captured by a camera, said system comprising:

a processor; and a memory storing instructions that, when executed by the processor, cause the system to:

detect an object in the image, determine one or more regions of the image in which a lower part of the detected object exists, determine a degree of confidence for each of the regions, the degree of confidence indicating likelihood of a corresponding region being a supporting surface region, select one or more of the regions based on each corresponding degree of confidence;

determine similarity of other regions in the image to at least one of the selected regions, and detect the supporting surface region based on the determined similarity.

Other aspects of the invention are also disclosed.

BRIEF DESCRIPTION OF THE DRAWINGS

One or more embodiments of the present invention will now be described with reference to the following drawings, in which:

FIG. 4A shows an image in one example of detecting tentative footprints;

FIG. 4B shows an image in another example of detecting tentative footprints;

DETAILED DESCRIPTION OF EMBODIMENTS OF THE INVENTION

Figure 1A:
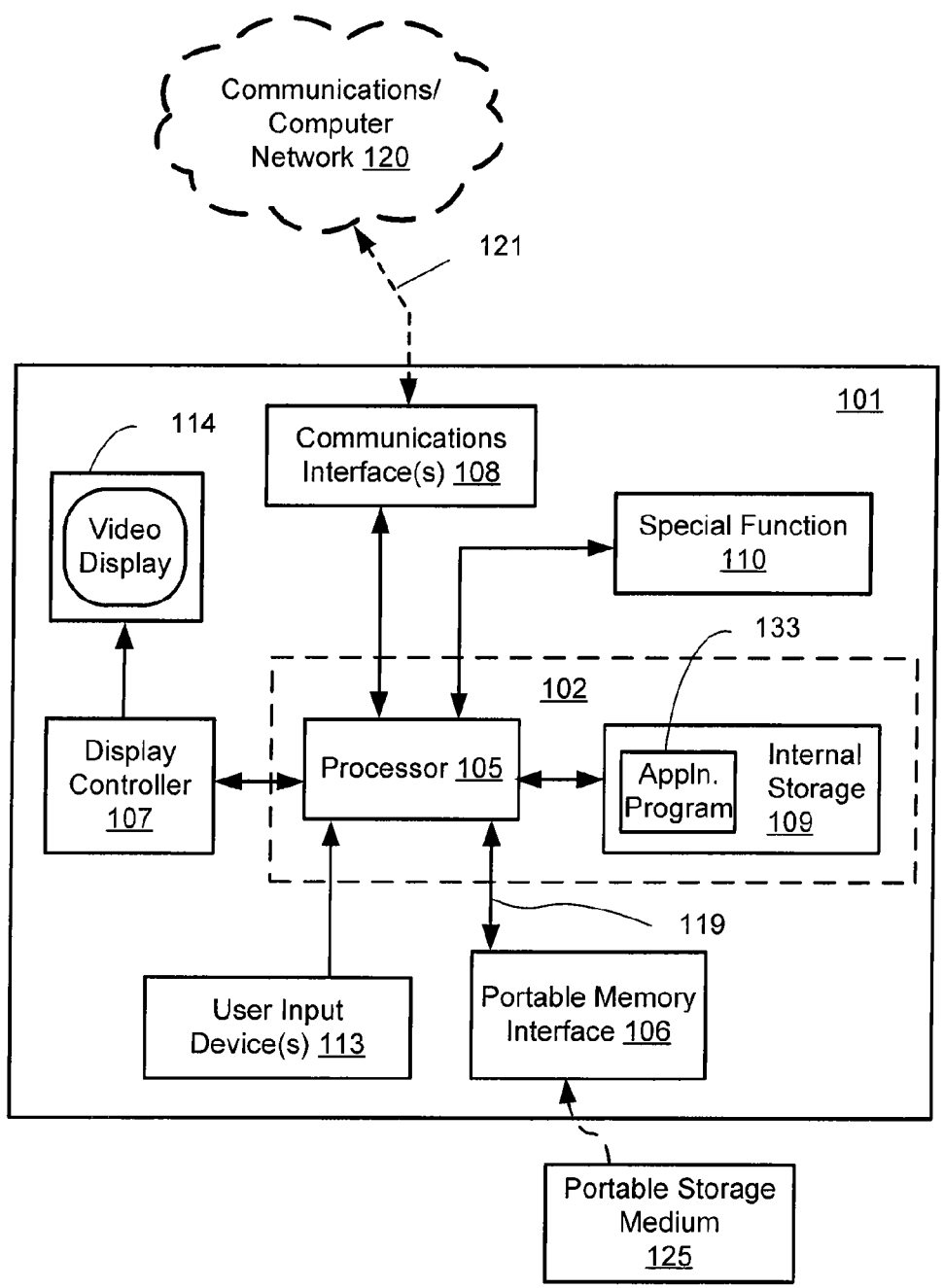
FIGS. 1A and 1B collectively form a schematic block diagram representation of an electronic device upon which described arrangements can be practised.

A video is a sequence of images. The terms "frame" and "image" are used throughout this specification interchangeably to describe a digital image captured at a specific time step in an image sequence. An image is made up of visual elements. Visual elements may be, for example, pixels or frequency domain 8×8 DCT (Discrete Cosine Transform) coefficient blocks, as used in JPEG images.

The term "floor region detection" refers to detecting a part of a scene that is traversable by moving targets from two-dimensional (2D) video images. Floor also refers to "ground", "road" or "surface", or any surface region supporting foreground targets. One example of a supporting surface region (or floor) is a ground floor supporting people (i.e., targets) on the ground floor. Another example of a supporting surface region is a ceiling supporting a light bulb attached to the ceiling. Another example of a supporting surface region is a wall supporting paintings attached to the wall.

The term "target" refers to an object in an image. Further, the term "footprint" refers to a contact point between a supporting surface region and a foreground target (or object). One example of a footprint is a contact point between a target representing a person and a supporting surface region representing the ground floor, where the contact point is a lowest point on the target. The lowest point on the target typically occurs on a lower part of the target. Still another example of a footprint is the contact point of the ceiling and the bulb attached to the ceiling. Still another example of a footprint is a contact point of the wall and a painting attached to the wall.

The term "static occlusion boundary" refers to a boundary or edge in a scene where a depth discontinuity occurs due to one static 3D structure in the scene occluding another object in the scene. Further, the term "occluder" refers to an object that appears in front of a second object within an image, causing part or all of the second object to be hidden from view. Such an occluder may also be referred to as an "obstacle". Still further, the term "occludee" refers to the object that is partly or fully hidden from view by an occluder. One example of a static occlusion boundary is the edge of a table that is adjacent to and in front of a person in a particular image. In such an example, the table is the occluder and the person is the occludee.

Reasoning about 3D scene structure is used for scene understanding in computer vision. In many instances, reasoning can proceed from low-level cues without resorting to full 3D scene reconstruction. However, existing geometric cues often require multiple viewpoints, supervised training, constraints on scene structure or information from other sensors. To address these limitations, geometric context for a single static camera may be recovered from the location and shape of moving foreground targets. In particular, likelihood of a static occlusion boundary and likelihood of a floor region at each pixel of an image may be determined. The cues described here do not require supervised training, prior knowledge of camera geometry or scene structure. The proposed geometric context may be used, for example, in applications including target reacquisition in the presence of occlusions and compositing synthetic targets into a static scene based on an inferred ordinal depth map.

Conventional geometric methods for recovering scene structure require multiple images with varying viewpoint, focus, lighting or other intrinsic or extrinsic parameters. Applications of practical interest, including surveillance and monitoring in particular, are dominated by static cameras in uncontrolled environments. If multiple views are present, the views are typically wide-baseline or non-overlapping. In these instances, structure recovery must rely on less robust single-view geometric cues.

Since single-view scene reconstruction is inherently under-constrained, existing methods for recovering scene structure need to incorporate prior knowledge. For example, one approach interprets line drawings based on known 3D polyhedral shapes. Another approach adopts the Manhattan world assumption as a constraint for single-view scene reconstruction for urban and indoor scenes containing orthogonal planes. Another approach assumes a planar ground and pinhole camera to enable recovery of metric ground plane properties. Another approach uses training images as prior knowledge for learning mapping between low-level features and 3D geometry in natural scenes.

Prior knowledge of planar structures, known camera model or supervised training data restricts existing single-view scene reconstruction methods to scenarios in which the prior knowledge is available. When prior knowledge is not available, scene geometry can be inferred from a single static camera by treating moving targets as exploratory "probes".

Regions in a static scene fall into three classes: regions that occlude foreground targets, regions that are occluded by foreground targets, and regions that support foreground targets (i.e. floor regions that contain target "footprints"). These classes are not mutually exclusive. One example is that a complex scene contains regions that are both occluders and occludees. Static occlusion boundaries between occluding and occluded regions correspond to depth discontinuities and provide a strong cue for 3D scene structure by inducing a depth ordering on neighbouring regions. Floor regions induce a depth ordering since the floor regions do not occlude other regions. Thus, segmenting an image into the above classes of regions produces an ordinal depth map.

The interactions of moving targets with static background provide valuable cues for single-view scene structure. One approach is based on analysing the location and shape of foreground regions detected using statistical background modelling. Another approach adopts a more robust minimum description length optimization for depth layer assignment based on the assumption that persistent edges of foreground targets coincide with occlusion boundaries. However, the optimization tends to over-segment the scene, especially in the presence of stationary targets.

Methods of extracting scene geometry from observations of moving targets in images captured by a static camera are described below. In one method, a static occlusion boundary likelihood map is generated. The static occlusion boundary likelihood map indicates the likelihood that each pixel of an image occurs on a boundary between occluding and occluded regions. The static occlusion boundary likelihood map method employs an assumption about the relationship between edges of foreground targets and depth discontinuities. The assumption is that static occlusions lead to a consistent change in shape of partially occluded foreground targets, which otherwise move non-rigidly or inconsistently.

Another of the described methods generates a floor likelihood map, which indicates the likelihood that each pixel of an image occurs in a target supporting surface region. The floor likelihood map method assumes that the floor has a unique appearance compared to non-floor regions. In one arrangement, the described methods employ occlusion reasoning and a floor appearance model based on superpixel statistics. Superpixels refer to image regions, image segments, or sets of pixels, which result from segmenting an image into visually coherent regions. The terms 'segments' and 'regions' may be used throughout this specification interchangeably to refer to sets of pixels. The constraints introduced by the described methods are satisfied in many scenes of practical interest, and are less restrictive than assumptions of known scene geometry, camera model or availability of training data.

Figure 1B:
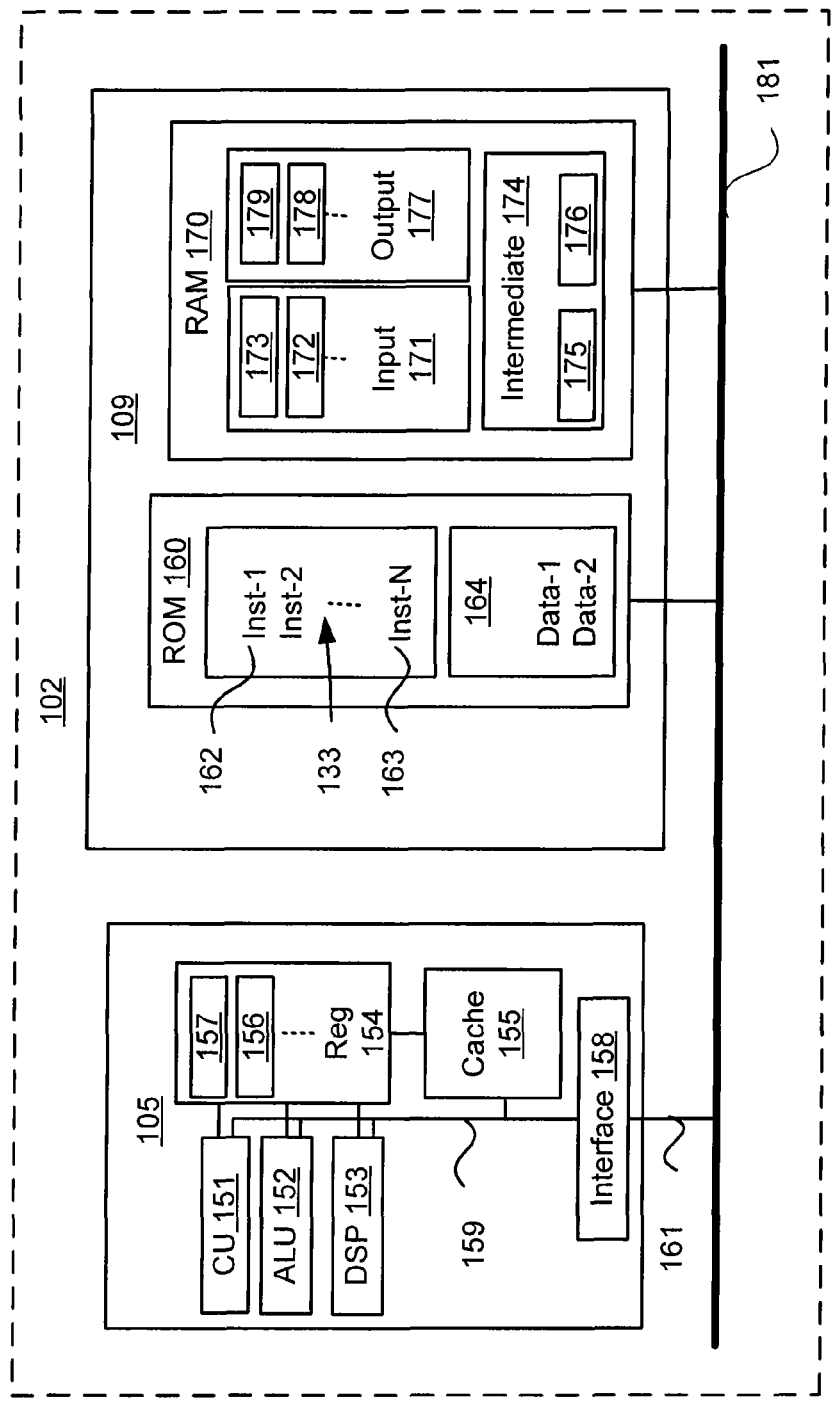

FIGS. 1A and 1B collectively form a schematic block diagram of a general purpose electronic device 101 including embedded components, upon which the methods to be described are desirably practiced. As described here, the electronic device 101 is a digital camera, in which processing resources are limited. Alternatively, the electronic device 101 may be, for example, a mobile phone or a portable media player, again in which processing resources are limited. Nevertheless, the methods to be described may also be performed on higher-level devices such as desktop computers, server computers, and other such devices with significantly larger processing resources.

As seen in FIG. 1A, the electronic device 101 comprises an embedded controller 102. Accordingly, the electronic device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The electronic device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth® type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. For example, where the device 101 is a digital camera, the components 110 may represent a lens, focus control and image sensor of the camera. The special function components 110 are connected to the embedded controller 102. As another example, the device 101 may be a mobile telephone handset. In this instance, the components 110 may represent those components required for communications in a cellular telephone environment. Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 2 to 10B may be implemented as one or more software application programs 133 executable within the embedded controller 102. The electronic device 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

A method 200 of detecting a floor region (or supporting surface region) in an image, will be described below with reference to FIG. 2. The method 200 recovers geometric context for the image from foreground targets detected within the image. The method 200 will be described by way of example with reference to the camera 101, where the camera 101 is in a static configuration when capturing the image. The method 200 may be implemented as one or more code modules of the software 133 resident in the ROM 160 of the camera 101 and being controlled in their execution by the processor 105.

The method 200 takes one or more video images captured by the single static camera 200 as input, and determines the likelihood of a static occlusion boundary and a floor region at each pixel of the images. Associated with the occlusion likelihood is a per-pixel orientation map that encodes relative depth of regions of an image neighbouring a discontinuity. The method 200 makes no assumptions about scene structure or target motion, except that sufficient targets are observed to reveal major structures of a scene captured in the image.

Figure 2:
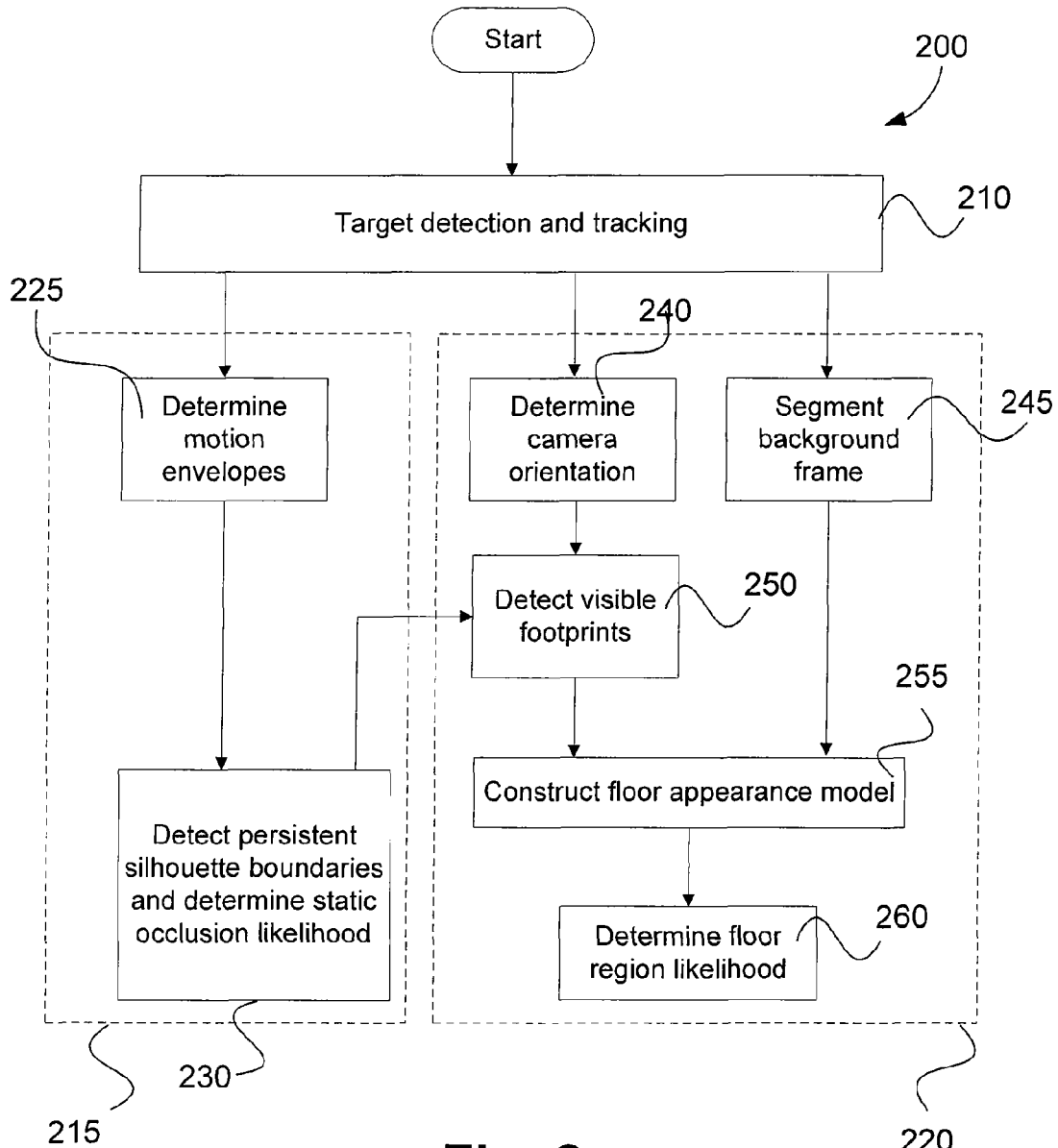
FIG. 2 is a flow diagram showing a method of detecting a floor region in an image.

As shown in FIG. 2, at a target detection and tracking step 210, the processor 105 is used for detecting and tracking binary foreground targets in each frame (or image) of the video. As described above, the term target refers to an object in an image. One or more such targets may be detected in each frame of the video at step 210. For example, a target may be detected in one frame (or image) of the video and may then be detected in a further frame (or image) of the video.

A background frame is also detected at step 210 for each frame of the video. In one arrangement, the foreground targets (corresponding to objects) are detected by performing foreground separation using a statistical background modelling method such as Mixture of Gaussian (MoG). The background model may be maintained over time and stored in RAM 170 of the camera 101. The background frame may be extracted from the video as a frame free of detected foreground targets. In another arrangement, the background frame may be extracted by using multi-level spatial-temporal median filtering on the images of the video processed by the method 200.

In another arrangement, a foreground separation method performed on Discrete Cosine Transform blocks may be used at step 210 to generate object positional information. The foreground separation method may operate on 8×8 DCT coefficient blocks.

The foreground target detection at step 210 is followed by performing object tracking on any detected foreground targets. In one arrangement, the object tracking may be performed using naïve tracking by assuming Brownian motion and associating a nearest neighbour. In still another arrangement, Kalman filtering may be used for the object tracking. In still another arrangement, an Alpha-Beta filter may be used for object tracking at step 210. The Alpha-Beta filter may use visual information about a target in addition to positional and velocity information.

In the method 200, likelihood maps are determined for an image per block rather than per pixel. For ease of explanation, the following description will not make this distinction.

In one arrangement, as described above, the object tracking performed at step 210 is naïve tracking by assuming Brownian motion and nearest neighbour association. For each frame of the video, tracks are associated one-to-one in a greedy manner with a nearest detected target satisfying a size ratio test. Unassociated detected targets are initialized as new tracks, and tracks that have no associated detected target are terminated.

Step 210 results in a set of regions corresponding to each of the foreground targets and corresponding temporal associations over the sequence of images of the video. Following step 210, the method 200 follows separate processing pipelines 215 and 220 for recovering occlusion likelihood 215 and floor likelihood 220, respectively. As described below, the interaction between the processing pipelines 215 and 220 is the use of occlusion likelihood, as determined at step 230, to reason about occluded targets during footprint detection at step 250. However, in another arrangement, the steps of each of the processing pipelines 215 and 220 may be performed independently without the use of occlusion likelihood at step 250.

As described below, static occlusion boundary detection is based on three premises. The first premise is that static occlusion boundaries occur at edges of individual foreground targets. The edges of the individual foreground targets may be referred to as silhouette boundary pixels. The second premise is that static occlusion boundaries do not occur inside any detected foreground target that is behind the same occlude (or obstacle). The third premise is that silhouette boundary pixels that lie on static occlusion boundaries have persistent location and orientation across different detected targets (objects). The occlusion boundaries are made of common silhouette boundary pixels of different detected targets (objects).

Figure 7A:
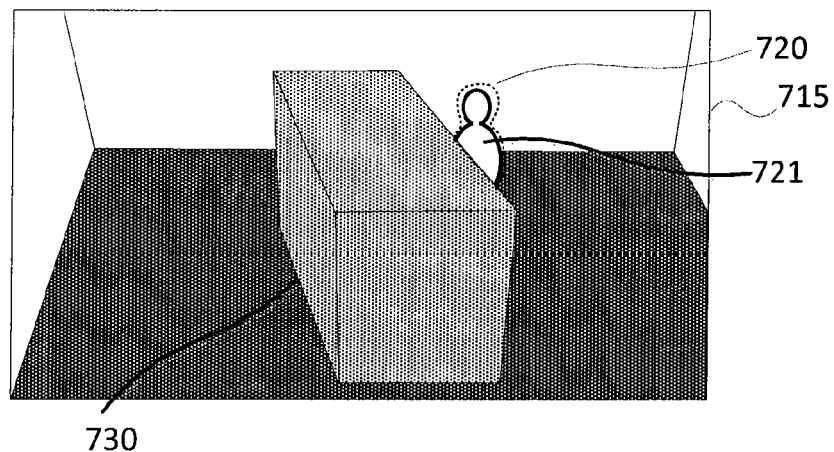
FIG. 7A shows silhouette boundary pixels of a first partially occluded target representing a person.

FIG. 7A shows silhouette boundary pixels 720 of a first partially occluded detected target 721 in a frame (or image) 715. As seen in FIG. 7A, the detected target 721 is an object representing a person. The boundary pixels 720 represent the edge of the target 721. The first premise states that a subset of the silhouette boundary pixels 720 lies on occlusion boundary 730 as seen in the frame (or image) 725 of FIG. 7C. The occlusion boundary 730 represents the boundary (or edge) of the occlusion (or obstacle) which occludes the target 721 in the frame (or image) 715.

Figure 7B:
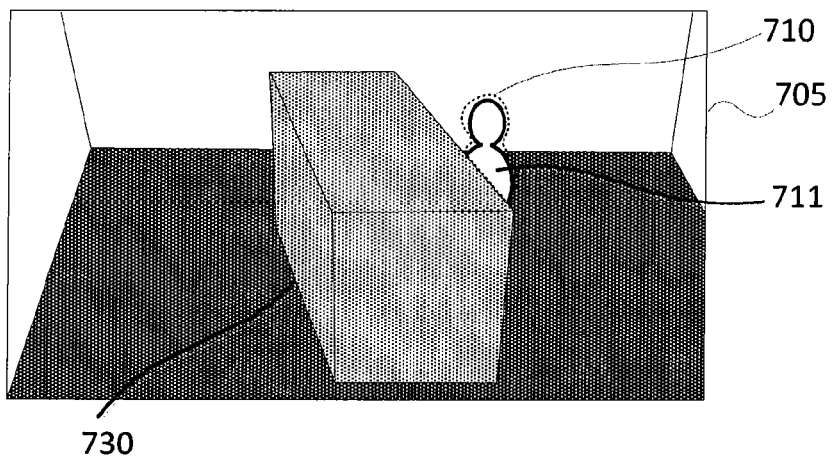
FIG. 7B shows silhouette boundary pixels of a second target which overlaps the first target of FIG. 7A.

The third premise states that the subset of the silhouette boundary pixels 720 has a persistent location and shape across multiple detected targets, since the subset is defined by the occlusion (or obstacle) rather than by the target. To identify the subset of silhouette boundary pixels 720, FIG. 7B shows a frame (or image) 705 comprising silhouette boundary pixels 710 of a second detected target 711 which overlaps the first detected target 721 behind the same occlusion (or obstacle). The boundary pixels 710 represent an edge of the target 711. The superposition of both detected targets 721 and 711 is shown in frame 725 of FIG. 7C. In particular, FIG. 7C shows the silhouette boundary pixels 720 representing the detected target 721 and the silhouette boundary pixels 710 representing the detected target 711.

Figure 7C:
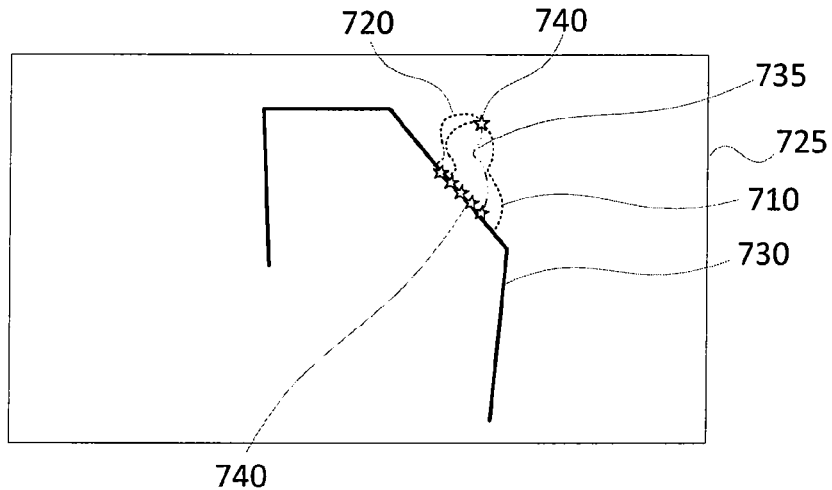
FIG. 7C shows the superposition of the targets of FIGS. 7A and 7B.

As shown in FIG. 7C, pixel locations 735 from the first detected target 721 that are interior to the second detected target 711 (i.e., interior to the boundary pixels 710 of the second detected target 711) violate the second premise and are discarded. The remaining boundary pixels (i.e., boundary pixels 740), shown as stars, are persistent across the two detected targets 721 and 711. The remaining boundary pixels are common between the targets (objects) 721 and 711. Accumulating evidence for the persistent pixel locations across all such overlapping detected targets (while discarding interior locations) provides evidence for static occlusion boundaries. As described below, the boundary pixels 740 represent a common location(s) for the edges of the detected targets 721 and 711. As such, the boundary pixels 740 represent a boundary of the occlusion (or obstacle) 730 comprising a part of the edges of each of the targets 721 and 711 at the common location.

Figure 6C:
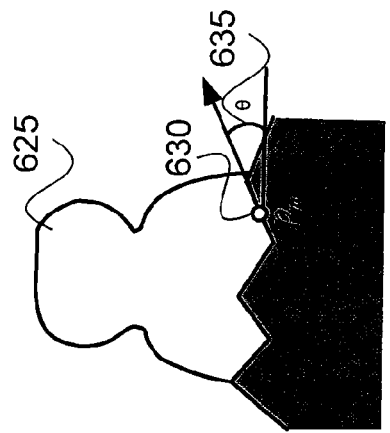
FIG. 6C shows a motion envelope determined based on the foreground targets of FIG. 6A.
Figure 6B:
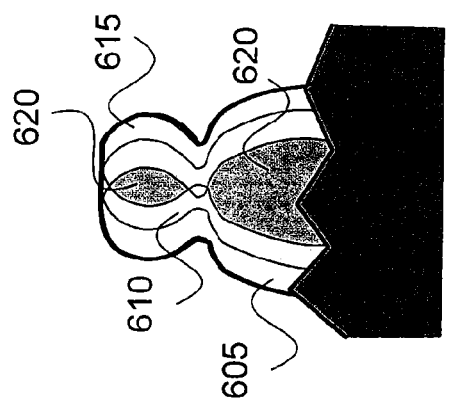
FIG. 6B shows an example of overlapping foreground targets of FIG. 6A.
Figure 6A:
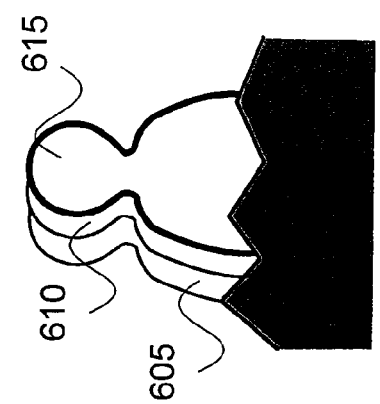
FIG. 6A shows an example of foreground targets.

Let $F=\{F_i\}$ represent the set of all detected foreground targets (objects) in a video sequence. Detected target $F_i$ is divided into boundary pixels $B_i=\{b_k\}$ (i.e. a set of pixels that are 8-connected to a background pixel) and interior pixels $\overline{B}_i=\{\overline{b}_j\}$ such that $F_i=B_i\cup\overline{B}_i$. The set $\hat{F}_i$ of detected targets that overlap $F_i$ is extracted by the overlapping detected target Equation (1), as follows:

$$\hat{F}_i=\{F_j:|F_i\cap F_j|>\rho\max(|F_i|,|F_j|)\forall j\neq i\} \quad (1)$$

where $\rho$ is a minimum overlap ratio threshold. Provided $\rho$ is sufficiently high (0.37, for example), the set $\hat{F}_i$ of detected targets that overlap $F_i$ will generally include overlapping targets behind the same occlusion (or obstacle) as $F_i$. Then, the set of non-interior silhouette boundary pixels $P_i\subseteq B_i$ for detected target $F_i$ is determined in accordance with Equation (2), as follows:

$$P_i=\{(p_m,\theta_m):p_m\in B_i, p_m\notin \overline{B}_j \forall F_j\in\hat{F}_i\} \quad (2)$$

where $p_m$ is the pixel location in an image of the video sequence and $\theta_m$ is the quantized boundary orientation, determined as a tangent orientation to the boundary of detected target $F_i$ which will be described in more detail below with reference to FIGS. 6A, 6B and 6C. The directed tangent is defined with detected target $F_i$ on the left (when looking in the direction of the tangent). Boundary orientation thus encodes relative depth of neighbouring regions, with the closer region (the occluder) on the right side. In one arrangement, $\theta_m$ is quantized into eight (8) orientation bins.

The likelihood of persistence $L_i(p_m)$ at each pixel location, $p_m\in P_i$, is measured as the proportion of overlapping targets that have a boundary (or edge) at the location, and may be determined using the likelihood of persistence Equation (3), as follows:

$$L_i(p_m) = \frac{1}{|\hat{F}_i|}\sum_{F_j\in\hat{F}_i}\sum_{b_k\in B_j}\delta(p_m, b_k) \quad (3)$$

where $\delta(\cdot,\cdot)$ is the Kronecker delta, and $|\cdot|$ is the cardinality of set $\cdot$. Finally, the total likelihood of persistence $L(p, \theta)$ for each discrete image location p and quantized orientation $\theta$ accumulated across all detected targets in the video sequence, may be determined in accordance with total likelihood of persistence Equation (4), as follows:

$$L(p,\theta)=\Sigma_i\Sigma_{(p_m,\theta_m)\in P_i}L_i(p_m)\cdot\delta(p,p_m)\cdot\delta(\theta,\theta_m) \quad (4)$$

Stationary targets (e.g., a person sitting, standing, etc.) can generate high occlusion likelihood where no occlusion exists, since static silhouette boundaries cannot be distinguished from persistent occlusion boundaries. Further, the method 200 involves $N^2$ set intersections (see Equation (1) for determining the set $\hat{F}_i$ of detected targets that overlap detected target $F_i$), where N is the number of detected targets, which can quickly become computationally intractable. As such, in one arrangement regions each track into a smaller set of motion envelopes, and apply persistent silhouette boundary detection to motion envelopes rather than raw detected targets.

Let $F=\{F_t:t=1, \ldots, T\}$ represent the set of regions of a foreground target tracked over T frames. The goal is to segment F into a set of N ($<$T) non-overlapping sub-intervals $F_i'=\{F_t:a_i\leq t\leq b_i\}$, $i=1,\ldots,N$ and determine a motion envelope $M_i$ in each sub-interval as the union of the regions corresponding to the foreground target. The motion envelope $M_i$ may be determined in accordance with motion envelope computation Equation (5), as follows:

$$M_i=U_{t=a_i}^{b_i}F_t \quad (5)$$

Motion envelopes defined by the motion envelope computation Equation (5) preserve the property that static occlusion boundaries coincide with the persistent silhouette boundary pixels. The shape of the occlusion boundary is preserved in the boundary of $M_i$. However, such a property is potentially lost when a target crosses the occlusion boundary (i.e. moves from behind to in front of an occluder). The loss may be avoided by choosing spatially compact sub-intervals. One example segmentation criteria is to choose $a_i$ and $b_i$ to yield a small overlap between $F_{a_i}$ and $F_{b_i}$ (see the shaded area 620 in FIG. 6B) by the motion envelope Equation (6), as follows:

$$|F_{a_i}\cap F_{b_i}|<\lambda\min(|F_{a_i}|,|F_{b_i}|) \quad (6)$$

where $\lambda$ is the maximum overlap ratio threshold (e.g., $\lambda=0.6$). In general, the number of regions in $F_i'$ for a foreground target varies with motion of the target. In particular, a large number of detected foreground targets are combined into a single motion envelope while a target is stationary. In this sense, the motion envelopes summarize target motion, reducing complexity and increasing robustness.

As will be described in further detail below, steps 225 and 230 of process 215 in the method 200 are used to determine static occlusion boundary likelihood and orientation maps from the accumulated likelihood L $(p, \theta)$ in accordance with Equations (7), as follows:

$$L(p)=\max_\theta L(p,\theta)$$

$$\Theta(p)=\arg\max_\theta L(p,\theta) \quad (7)$$

The likelihood and orientation in Equation (7) are valid at pixel locations where more than one non-interior silhouette boundary is observed. The silhouette boundaries represent the edges of regions corresponding to any targets detected in step 210. The pixel locations where more than one non-interior silhouette boundary is observed represent a common location for the silhouette boundaries of a plurality of such detected targets. Such a constraint may be represented as a confidence mask in accordance with Equation (8), as follows:

$$C(p) = \Sigma_i \Sigma_{p_m \in P_i} \delta(p, p_m) \qquad (8)$$

The floor likelihood estimation processing pipeline 220 of the method 200 is used to detect regions that support moving targets. Such regions are likely to contain target footprints. Floor regions (or supporting surface regions) are often piecewise planar rather than strictly planar, and targets often walk only on narrow, well-defined paths rather than distributing uniformly across a floor region. Footprint-based floor detection methods which make assumptions about geometry (e.g. planar ground) or connectivity (e.g. region growing) are therefore only likely to find part of a floor region. In view of this, in the described methods, the floor is assumed to have a unique appearance compared to non-floor regions. The appearance of the floor may be modelled using a non-parametric, multi-model colour distribution over superpixel regions that contain target footprints. Partially occluded targets may be detected and filtered out, to avoid corrupting the model with false footprints. The non-parametric, multi-modal colour distribution model may be used to assign a floor likelihood value to each superpixel in an image, regardless of whether a corresponding superpixel region contains footprints. The multi-model colour distribution model may be used to find floors with coloured patterns (e.g. tiled floors), and disconnected regions due to occlusions, since the multi-model colour distribution model does not require targets to traverse all areas of the floor. The multi-model colour distribution model will be described in more detail below.

A footprint may be defined as a lowest point on a detected target (or object) in an image (e.g. a person's shoe or a car's tyre). The lowest point is defined as the point on a target which is closest to the floor in a scene captured within an image. In one example, the projection of the footprints in an image corresponds to the lowest point in the image when a camera (e.g., 101) used to capture the image is in a "normal" upright orientation. In another example, (such as top-down viewpoints or catadioptric omnidirectional cameras), the projection of the footprints in an image does not correspond to the lowest point in the image. In one arrangement, footprint detection may be determined based on a point on a detected target closest to a vertical vanishing point in an image. The vertical vanishing point (corresponding to the "down" direction) may be estimated from the detected foreground targets. Such an estimation is based on the observation that people typically walk in an upright pose, so that the line connecting the head and feet is in the vertical orientation. Thus, the major axis of multiple foreground targets intersect approximately at the vertical vanishing point.

In another arrangement, the camera 101 is assumed to be in the upright orientation and the lowest point on the target within an image is the footprint. However, due to shadows and reflections, edges of a region corresponding to a target may not coincide with edges of the target. Thus, a refinement step may be adopted to localize the true footprint. The refinement starts at the lowest point on a foreground mask closest to the central vertical axis of the target and takes the strongest intensity edge above the lowest point as the true footprint.

The assumption that the detected footprint touches the floor may be violated when the target is partially occluded, which occurs frequently in cluttered scenes. Detection and removal of partially occluded targets is performed to ensure the estimated floor model remains free of non-floor pixels. Observing that partial occlusions typically generate false footprints on occlusion boundaries, occlusions can be detected by testing whether the occlusion boundary likelihood at putative footprint locations exceeds an empirical threshold.

The underlying assumption in building a floor appearance model is that the statistics of the entire floor is captured in a few representative superpixels. The representative superpixels are chosen as those superpixels with a high likelihood of corresponding to a floor region, based on evidence from observed footprint locations. The superpixel segmentation may be determined on a background frame (e.g., frame 725 of FIG. 7C) so that the pixel statistics capture only the static scene content. Thus, the background frame is free of foreground targets.

In one arrangement, regular grid cells or fixed-size patches (e.g., 8×8 pixels), around each pixel are used as (top-down) superpixels. In another arrangement, data-driven (bottom-up) segmentation may be used to ensure statistics are gathered over regions that do not cross high contrast background edges. In one arrangement, watershed superpixel segmentation is used to generate data-driven superpixels. In still another arrangement, geodesic superpixel segmentation is used to generate data-driven superpixels.

The presence of a footprint within a superpixel is a strong indicator that the superpixel represents a floor region. However, numerous sources of noise, including spurious foreground targets due to camera jitter, reflections, shadows, and incorrect filtering of occluded targets, lead to false footprint detections. Robustness to noise may be strengthened by selecting only superpixels that contain N (empirically chosen, for example N=3) or more footprints. Each selected superpixel is assumed to capture a different aspect of the floor's appearance (e.g. different coloured tiles), and contributes a unique mode to a non-parametric multi-modal mixture model. In one example, such as large homogeneous floor regions, some modes turn out to be identical. In one arrangement, further processing may be applied to combine the identical modes. In another arrangement, the identical modes may be left in the multi-modal mixture model without combining the identical modes together.

Supposing K superpixels having N footprints are selected, in one arrangement, the k-th mode, k=1, ..., K, may be modelled for each selected superpixels as a triplet of normalized colour histograms, corresponding to the marginal distributions of pixel values in YCrCb space; the histogram for the c-th channel, c=1, ..., 3, is $H_{c,k} = \{h_{c,k,b}\}$, where $\Sigma_b h_{c,k,b}=1$, and b=1, ..., B ranges over the B histogram bins. The overall floor appearance is the set of histograms for all channels of every mode, $H = \{H_{c,k}\}$.

Any superpixel that is sufficiently similar to at least one of the superpixels that contains N (N=3, for example) or more footprints is also likely to be floor. For the j-th superpixel, the corresponding similarity metric is the minimum distance, $\hat{d}_j$, between the normalized colour histogram triplet $G_{c,j}$ of the j-th superpixel and all modes in the floor appearance model, which may be determined in accordance with Equation (9), as follows:

$$\hat{d}_j = \min_k \sum_{c=1}^{3} d(G_{c,j}, H_{c,k})$$

(9)

where d(•) is the "earth mover's distance". In one arrangement, $\hat{d}_j$ can be interpreted directly as a likelihood. In another arrangement, $\hat{d}_j$ is mapped to the range [0,1] by likelihood function $L_j$ in accordance with Equation (10), as follows:

$$L_j = \exp(-(\hat{d}_j/\sigma)^2) \quad (10)$$

where σ is an empirically chosen scaling factor (e.g., σ=0.9), which depends on the expected sensor noise and variation in floor appearance. The value $L_j$ is proportional to the conditional probability of observing $\hat{d}_j$ given that the j-th superpixel is a floor region. Finally, the floor likelihood map is constructed by assigning $L_j$ to all pixel locations in the j-th superpixel.

The proposed single-view geometric cues will now be further described by way of example. In one example, target reacquisition may be performed after a tracked target leaves a scene captured in an image and reappears under partial occlusion. In another example, partially occluded synthetic targets may be composited into a scene of an image. The proposed single-view geometric cues may also be used for tracking, scene understanding and video compression.

In surveillance applications, long-term tracking and behaviour analysis requires robust reacquisition of targets that move in and out of view, or between widely separated views. Target reacquisition is a recognition problem, where a set of appearance models are maintained for targets that exited a scene, while newly appearing targets (i.e. queries) are matched against the stored models. Unfortunately, target reacquisition is non-trivial in cluttered scenes, where occlusions (or obstacles) affect target appearance and impede matching. For example, targets moving through a convenience store typically exit unoccluded, but reappear while severely occluded by an obstacle such as a shelving unit. Such cluttered scenes may be processed using models that are robust to occlusion, e.g. colour co-occurrence histograms. However, even robust models are likely to fail under moderately severe occlusions due to changes in pose and viewpoint.

Target reacquisition may be improved by explicitly finding a sub-region representing the unoccluded area of a query and target, and matching only the sub-region. Finding such a sub-region permits accurate matching using a simple colour histogram appearance model that is otherwise brittle under partial occlusions. Given bounding boxes around the query and model detected targets, an occlusion reasoning method proceeds by determining which bounding box edges are behind static occluders, and aligning visible edges to establish the visible sub-regions suitable for matching.

The occlusion status of each bounding box edge is established by finding the closest foreground pixel along each image row (for vertical edges) or column (for horizontal edges) and determining the average occlusion likelihood at the corresponding pixel locations. If the likelihood exceeds an empirical threshold (e.g., 0.25), the bounding box edge is deemed to lie behind an occluder. Aligning the visible query edges to the visible model edges (i.e. aligning all edges except the bottom edge) establishes the visible sub-region of the model. A matching score between the query and model based on pixels in the visible sub-regions may be determined.

Video compositing is the process of inserting synthetic objects into a real scene of an image, and is a common task in applications such as augmented reality and visualization (e.g., sports broadcasting). In typical cluttered environments, the compositing needs to ensure inserted objects respect scene occlusions. Typically, this is achieved by decomposing the scene into partially transparent, depth ordered layers, such that opaque pixels in higher layers occlude those in lower layers. Synthetic content with correct occlusion handling can then be added to the image by inserting new objects between the existing scene layers. A depth ordered layered representation suitable for compositing can be recovered from the occlusion boundary and the proposed floor likelihood cues.

Layer extraction may be posed for depth label assignment on a superpixel segmentation of the scene. In one arrangement, a Markov Random Field (MRF)-based approach may be used for the depth assignment. An underlying assumption in using layer extraction is that superpixel boundaries align with floor region boundaries and static occlusion boundaries. For example, let $D=\{d_0, \ldots, d_N\}$ represent the set of decreasing depth labels that can be assigned to superpixels. A label assignment is desired that satisfies depth order constraints on superpixels separated by an occlusion boundary, and assigns greatest depth $d_0$ to floor regions with high likelihood.

The Markov Random Field (MRF) is constructed with a node per superpixel and an edge joining neighbouring superpixels. Let $S_i$ represent the set of pixels in the i-th superpixel and $x_i$ represent the assigned depth label. Then, the unitary node potentials $E_{floor}(x_i)$ penalize labels inconsistent with average floor likelihood in $S_i$, in accordance with Equation (11), as follows:

$$E_{floor}(x_i) = \begin{cases} 1 - \sum_{p \in S_i} L_{floor}(p)/|S_i|, & \text{if } x_i = d_0 \\ \sum_{p \in S_i} L_{floor}(p)/|S_i|, & \text{if } x_i \neq d_0 \end{cases} \quad (11)$$

where $L_{floor}(p)$ is the floor likelihood at image location p.

To determine the pairwise node potentials, $E_{occ}(x_i, x_j)$, it may be determined whether an occlusion boundary exists between regions $s_i$ and $s_j$. A decision rule involves thresholding the static occlusion boundary likelihood map (e.g., using a value of 0.15) and counting the number of high-likelihood occlusion pixels that occur on the boundary between $s_i$ and $s_j$. If the number of high-likelihood occlusion pixels exceeds an empirically chosen threshold (for example, 0.1 of the length of the boundary between $s_i$ and $s_j$), the superpixels are assumed to lie at different depths. The relative depth of the superpixels may be determined from the average orientation of high-likelihood occlusion pixels on the boundary between $s_i$ and $s_j$. The pairwise potential $E_{occ}(x_i, x_j)$ may be constructed to penalize depth labels that violate the observed depth order. For example, if $s_i$ is determined to be closer than $s_j$, pairwise potential, $E_{occ}(x_i, x_j)$ may be determined in accordance with Equation (12), as follows:

$$E_{occ}(x_i, x_j) = \begin{cases} \omega_{occ}, & \text{if } x_i \geq x_j \\ 0, & \text{otherwise} \end{cases} \quad (12)$$

For superpixels that are not separated by an occlusion boundary, the pairwise potential enforces a smoothness constraint, in accordance with Equation (13), as follows:

$$E_{occ}(x_i, x_j) = \begin{cases} \omega_{smooth}, & \text{if } x_i \neq x_j \\ 0, & \text{otherwise} \end{cases} \quad (13)$$

In Equations (12) and (13), $\omega_{occ}$ and $\omega_{smooth}$ are empirically chosen to balance the contribution of each potential function (e.g., $\omega_{occ}$=1.0 and $\omega_{smooth}$=1.1).

Given the recovered depth layers, the synthetic targets are inserted into the scene of an image based on standard compositing techniques (e.g., chroma keying).

As described, geometric cues related to static 3D scene structure may be recovered by analysing the location and shape of moving targets in images of a video sequence captured by a static camera (e.g., 101). Two cues related to ordinal depth may be used: per-pixel static occlusion boundary likelihood and floor region likelihood. The described methods for extracting the cues outperform similar conventional methods. Furthermore, the geometric cues are useful as described above.

As also described, the geometric cues may be obtained in the absence of supervised training or prior information about calibration of the camera 101 and scene geometry. Minimal assumptions about the scene content are required. For example, occlusion boundaries do not have to coincide with intensity boundaries, and the floor appearance need not be homogeneous or even smooth. The main assumptions are that sufficient foreground targets with varying shape and motion are present in the scene to reveal static geometry, and the appearance of the floor differs from non-floor regions.

Floor detection relies heavily on accurate footprints, which can be corrupted by shadows and reflections, especially on polished floors. In one arrangement, detection of foreground targets may be performed using pedestrian classification. The described methods are effective in environments populated with free-ranging targets with varying shape, which applies to a wide range of practical scenarios.

Figure 10A:
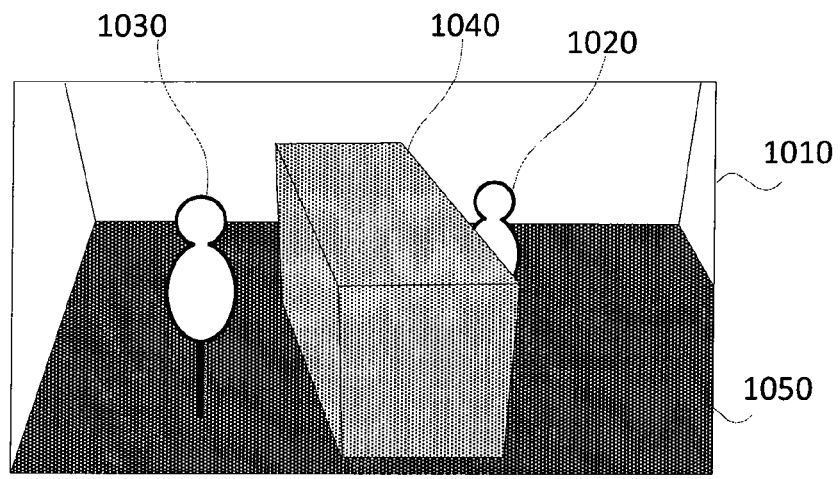
FIG. 10A shows an example image with two targets walking in a static scene.

FIG. 10A shows an example image 1010 captured by the static camera 101. Regions within the scene captured in the image 1010 fall into one of the three classes described above. In the frame 1010, two targets 1020 and 1030 are walking in a static scene, which consists of floor region 1050 and a box 1040. Target 1020 is partially occluded by box 1040. Accordingly, the box 104 may be referred to as an occluder or obstacle.

Figure 10B:
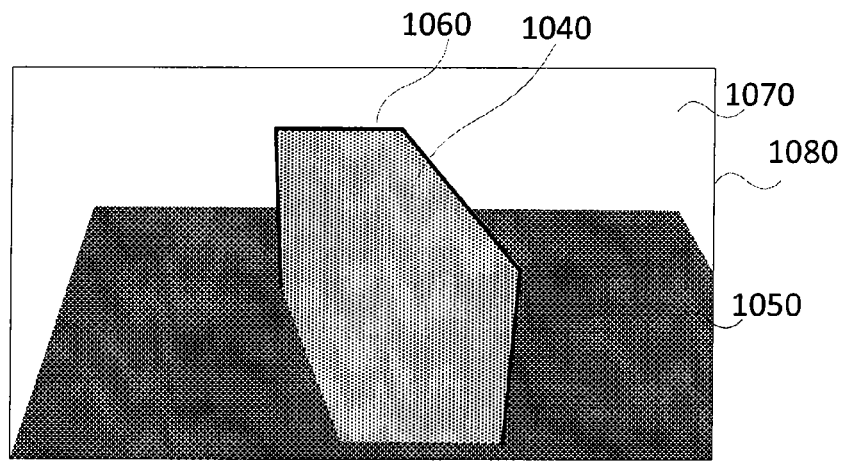
FIG. 10B shows the image of FIG. 10A without the targets.

FIG. 10B shows another example image 1080 of the scene without the targets 1020 and 1030. The image 1080 depicts a static scene and may be referred to as a "background frame". Regions in the static scene, as seen in FIG. 10B, fall into one of the three classes described above. The first class of regions (e.g., region) 1040 occlude foreground targets (e.g., 1020). The second class of regions (e.g., region) 1070, as seen in FIG. 10B, are occluded by foreground targets 1020 and 1030. The third class of regions (e.g., region 1050) support foreground targets 1020 and 1030. The three classes of regions are not mutually exclusive. For example, the box 1040 occludes the foreground target 1020 and can be occluded by another foreground target. Static occlusion boundaries 1060 between occluding region 1040 and occluded regions 1070 or floor region 1050 correspond to depth discontinuities. Floor regions, such as the floor region 1050, induce a depth ordering since the floor regions do not occlude other regions. Thus, segmenting an image into the three classes of regions produces an ordinal depth map.

The method 200 of detecting a floor region (or supporting surface region) in an image, will now be further described below with reference to FIG. 2. The method 200 may be used to estimate the static occlusion boundary likelihood and use the static occlusion boundary likelihood to estimate the likelihood of the floor region.

The method 200 takes one or more images of a video sequence captured by the camera 101 as input. However, the method 200 will be described with reference to one image of the video sequence. As described above, at target detection and tracking step 210, foreground targets are detected and tracked under execution of the processor 105. In one arrangement, such foreground targets are detected at step 210 by performing foreground separation using a background modelling method such as Mixture of Gaussian (MoG), under execution of the processor 105. The background model is maintained over time and stored in memory 106. In another arrangement, a foreground separation method may be performed on Discrete Cosine Transform blocks, at step 210, to generate object positional information. The foreground target detection may be followed by performing object tracking on the detected foreground targets. In one arrangement, naïve tracking may be performed by assuming Brownian motion and associating a nearest neighbour. In another arrangement, Kalman filtering may be performed at step 210, under execution of the processor 1005 for foreground target tracking. In still another arrangement, an Alpha-Beta filter may be used at step 210 for foreground target tracking. In a still further arrangement, the filter uses visual information about the target in addition to positional and velocity information.

As seen in FIG. 2, control then passes from step 210 to static occlusion boundary likelihood estimation process 215. Outputs from process 215 and outputs from step 210 are input into floor region likelihood estimation process 220.

In the static occlusion boundary likelihood estimation process 215, control proceeds from step 210 to a motion envelope step 225, in which motion envelopes are determined, under execution of the processor 105, and stored in RAM 170. A motion envelope is the union of regions corresponding to one or more foreground targets (or objects) in consecutive frames, and will now be described by way of example with reference to FIGS. 6A to 6C. In determining the motion envelope, a plurality of regions of an image in which a target (or object) is detected may be determined from different images of a video. Locations of edges of the regions are also determined For example, as seen in FIG. 6A, foreground target 605, denoted by $F_a$, is detected in a frame at time t=a. The target 605 has an edge at a location shown in FIG. 6A. The same foreground target 610, denoted by $F_{a+1}$, is detected in a frame at time t=a+1, and the foreground target 615, denoted by $F_b$, is detected in a frame at a later time t=b (where a≤b). The targets 610 and 615 have edges at locations shown in FIG. 6A. As seen in FIG. 6C, motion envelope 625 is the union of regions corresponding to each of the foreground targets 605, 610 and 615. In one arrangement, the number of foreground targets included in the union is determined by the overlap between regions of the first foreground target $F_a$ and the last foreground target $F_b$. t=a and t=b are chosen to yield an overlap 620, as seen in FIG. 6B, which is smaller than a fraction λ (e.g., λ=0.6) of the minimum area between $F_a$ 605 and $F_b$ 615 (using the motion envelope Equation (6)).

Control passes from step 225 to a determining step 230, in which the persistent silhouette boundaries are detected under execution of the processor 105 and stored in RAM 170. The detected persistent silhouette boundaries represent the locations of edges of regions corresponding to any targets (or objects) detected in step 210. As described above, static occlusion boundary detection is based on three premises. The first premise is that static occlusion boundaries occur at the edges of individual foreground targets. As described above, the edges of the individual foreground targets may be known as silhouette boundary pixels. Similarly, the edges of each motion envelope may also be known as silhouette boundary pixels. The second premise is that static occlusion boundaries do not occur inside any detected foreground target that is behind the same occlude (or obstacle). The third premise is that silhouette boundary pixels that lie on static occlusion boundaries have persistent location and orientation across different detected targets.

An example of measuring boundary persistence of pixels will now be described with reference to FIGS. 7A to 7C. Two example frames (or images) 715 and 705 of a video sequence are shown in FIGS. 7A and 7B, respectively. A first boundary, as represented by boundary pixels 720, of foreground target 721 is detected in frame 715. The boundary pixels 720 represent the edge of the target 721. A second boundary, as represented by boundary pixels 710, of foreground target 711 is detected in frame 705. The boundary pixels 710 represent an edge of the target 711. Both of the detected targets 721 and 711 are behind the same occlusion (or obstacle) 730. In one example, the two boundaries represented by corresponding boundary pixels 720 and 710 are from the same target detected in two different frames. In another example, the two boundaries may be from different targets detected in two different frames. In yet another example, the two boundaries may be from two different motion envelopes. FIG. 7C shows the superposition of the boundaries from the two detected targets 721 and 711. As described above, pixel locations 735 of the boundary pixels 720 that are interior to the boundary pixels 710 violate the second premise and are discarded. Of the remaining boundary pixels 720, boundary pixels 740 (denoted by stars) are persistent across the two detected targets 721 and 711. The boundary pixels 740 represent a common location(s) for the edges of the detected targets 721 and 711. As such, the boundary pixels 740 represent a boundary of the occlusion (or obstacle) 730 comprising a part of the edges of each of the targets 721 and 711 at the common location.

Also at step 230, the static occlusion likelihood is determined, under execution of the processor 105, based on persistent pixels. A method 500 of determining static occlusion likelihood, as executed at step 230, will be described in detail below with reference to FIG. 5. The likelihood of persistence $L_i(p_m)$ at each pixel location, $p_m \in P_i$, is measured as proportion of overlapping targets that have a boundary (or edge) at this location, in accordance with Equation (3) as described above. As described above, the total likelihood of persistence $L(p, \theta)$ for each discrete image pixel location p and quantized orientation $\theta$ may be accumulated across all detected targets in the video sequence in accordance with Equation (4) as described above. The static occlusion likelihood $L(p)$ and orientation maps $\Theta(p)$ are determined from the total likelihood of persistence $L(p, \theta)$ in accordance with Equations (7) as described above. In the floor region likelihood estimation process 220, control proceeds from step 210 to a camera orientation step 240 and segment background frame step 245 in parallel. At step 240, orientation of the camera 101 is determined under execution of the processor 105. Further, at step 245 the background frame of the video sequence is segmented into one or more regions.

Figure 8:
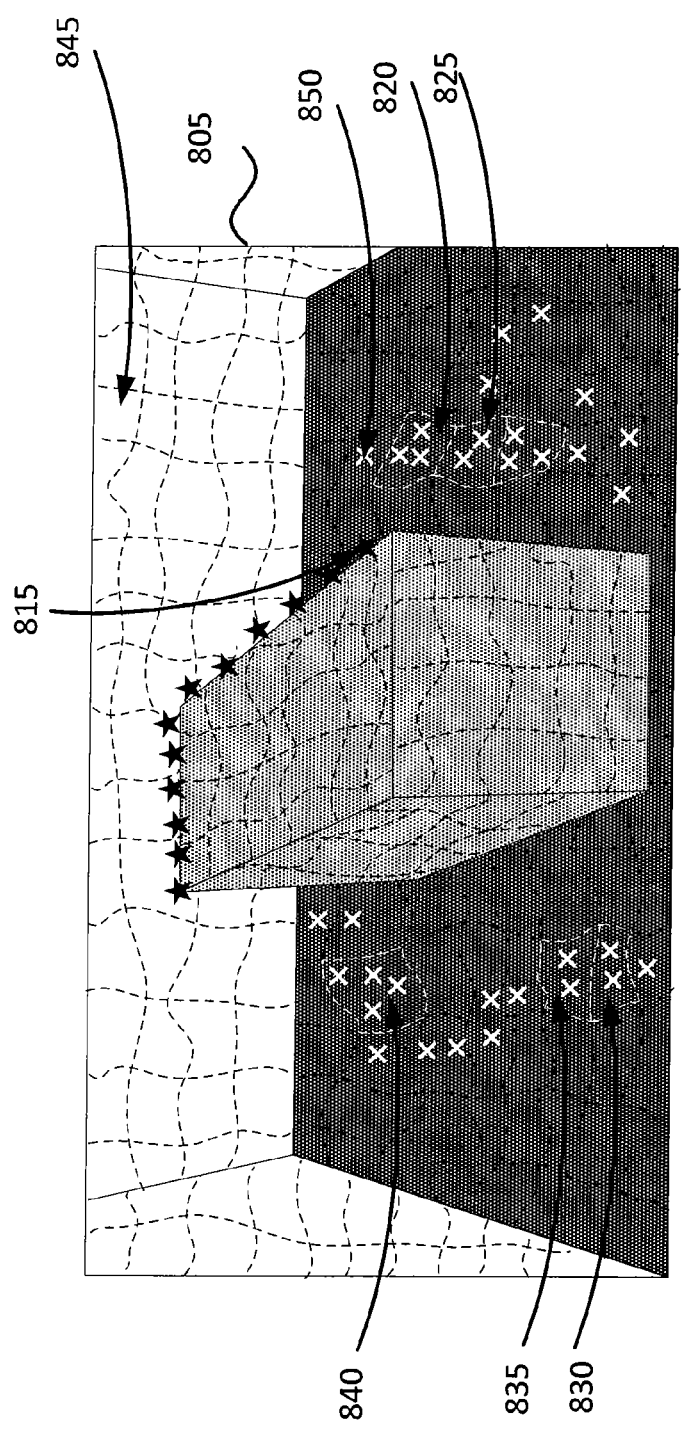
FIG. 8 shows a background image including detected footprints.

In step 240, camera orientation with respect to the moving targets is determined to detect locations of tentative footprints of the targets. The determined orientation may be stored within RAM 170. FIG. 4A show an example of detecting tentative footprints, when the camera 101 is tilted downwards capturing frame 405. In one example setting for the frame 405, three targets 415, 420 and 425 are detected in the same frame 405. In another example setting, the three targets 415, 420 and 425 are detected in different frames and superimposed into the frame 405. The major axis of each foreground target (i.e., major axis 430 for target 415, major axis 435 for target 420 and major axis 440 for target 425) is estimated by singular value decomposition (SVD) on the foreground target. Assuming most of the time targets (e.g., 415, 420) move in an upright pose, the major axis of the target in the 3D scene captured in the frame 405 is in the vertical orientation. The projections of the major axes in the frame 405 (e.g., 430, 435 and 440) intersect at the vertical vanishing point 460 as seen in FIG. 4A. The tentative footprint location (e.g., footprint 445 of foreground target 415) is the point on the foreground target which is the closest to the vertical vanishing point 460. In the example of FIG. 4A, the footprint location (445, 450 and 455) is also the lowest point on the detected foreground target (415, 420 and 425) respectively. In another arrangement, the footprint is extracted as the lowest point on the detected foreground target. FIG. 8 shows one example of extracted footprints, denoted as black stars 815 and the white crosses 850 in FIG. 8. Each of the extracted footprints has one or more associated pixels. The example of FIG. 8 will be described in detail below.

In another example setting, as shown in FIG. 4B, the camera 101 is looking upside-down, capturing frame 410. In one example of FIG. 4B for the frame 410, three targets 465, 470 and 475 are detected in the same frame 410. In another example setting for the frame 410, three targets 465, 470 and 475 are detected in different frames and superimposed into one frame 410. The major axis of each foreground target (major axis 480 for target 465, major axis 485 for target 470 and major axis 490 for target 475) may be estimated by singular value decomposition (SVD) on the foreground target. Again, assuming most of the time targets (e.g., targets 465, 470) move in an upright pose, the major axis of the target is in the 3D scene is in the vertical orientation. The projections of the major axes in the frame 410 (e.g., 480, 485 and 490) intersect at the vertical vanishing point 497. The tentative footprint location (e.g., footprint 490 of foreground target 465) is the point on the foreground target which is closest to vertical vanishing point 497. In the example of FIG. 4B, the footprint location 490 is the uppermost point on the detected foreground target 465. In another arrangement, the footprint is extracted as the uppermost point on the detected foreground target.

At segmenting step 245, the background frame detected in the video sequence is segmented into one or more regions. As described above, the background frame may be extracted as the frame free of foreground targets in the target detection and tracking step 210. Any suitable image segmentation method may be used in step 245 (e.g., superpixel segmentation and watershed segmentation). For example, FIG. 8 is an image 805 showing one example of the output of step 245. The image 805 represents the background frame (e.g., 1080) of the scene in the example of FIGS. 10A and 10B. The background frame 805 is segmented, as at step 245, into multiple regions (e.g., 845, 830, 835) as seen in FIG. 8.

Then at detection step 250, visible footprints are detected based on the locations determined at step 240 and the static occlusion likelihood determined at step 230. The detected visible footprints may be used for filtering out false footprints at step 250. A false footprint is a detected footprint that does not represent a contact point between the target (or object) and a supporting surface (i.e., a surface such as floor region 1050 supporting the target). One reason for false footprint detection is partial occlusion of the foreground target. For example, target (or object) 1020 is partially occluded by the box 1040. The box 1040 may be referred to as an obstacle.

The footprint of the target 1020 is detected as point 815 in step 240. However, footprint 815 is a false footprint detection due to occlusion. The false footprints (e.g., footprint 815) may be filtered out using static occlusion likelihood. If the static occlusion likelihood of the footprint detected in step 240 is lower than a given threshold (e.g., 0.1), the footprint is confirmed as a true footprint. If the static occlusion likelihood of the footprint detected in step 240 is higher than a given threshold (e.g., 0.1), the footprint is filtered out as a false detection.

The outputs from step 250 and step 245 are processed at construction step 255, under execution of the processor 105, to construct a floor appearance model. A method 300A of constructing a floor appearance model, as executed at step 255, will be described in detail below with reference to FIG. 3A.

Control then proceeds from step 255 to floor region likelihood step 260 to determine the floor region likelihood. The floor region likelihood is represented by a floor likelihood map. A method 300B of determining floor region likelihood, as executed at step 260, will be described in detail below with reference to FIG. 3B.

In another arrangement, false footprints may be detected at step 250 by comparing the patch in an edge image of a background frame, and a corresponding patch in a suppressed edge image of a current frame of the input video. The edge image of the background frame is denoted as B(m, n). B(m, n)=0 if the (m, n)-th pixel of the background frame is not located at an edge, and B(m, n)=1 if the (m, n)-th pixel of the background frame is located at an edge. The edge image of the current frame is denoted as F(m, n). F(m, n)=0 if the (m, n)-th pixel of the current frame is not located at an edge, and F(m, n)=1 if the (m, n)-th pixel of the current frame is located at an edge. Then the suppressed edge image of the current frame, denoted as S(m, n), is the minimum value of the corresponding background frame edge image B (m, n) and the corresponding current frame edge image F (m, n), in accordance with Equation (14) as follows:

$$S(m,n)=\min(B(m,n),F(m,n)) \quad (14)$$

The edge image B (m, n) or F (m, n) may be determined by any edge detection method performed on the background frame or the current frame, such as Canny edge detection and Sobel edge detection. The false footprint is detected by comparing a fixed-size (for example, 8×8 pixels) image patch at the footprint in B (m, n) and a fixed-size image patch at the footprint in F(m, n). If a similarity score (e.g., normalized cross-correlation score) of the two patches is higher than a threshold (e.g., normalized cross-correlation greater than 0.6), the footprint is filtered out as a false footprint detection. If the similarity score of the two patches is lower than a threshold (for example, normalized cross-correlation less than 0.6), the footprint is confirmed as a true detection.

The filtering of false footprints by comparing image patches in the edge images B(m, n) and F(m, n), as at step 250, will now be described in more detail with reference to FIGS. 9A to 9F.

Figure 9A:
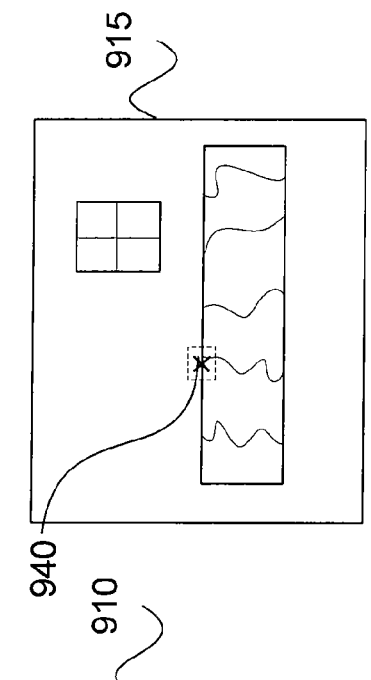
FIGS. 9A, 9B and 9C show images used in one example of false footprint filtering by comparing image patches.
Figure 9B:
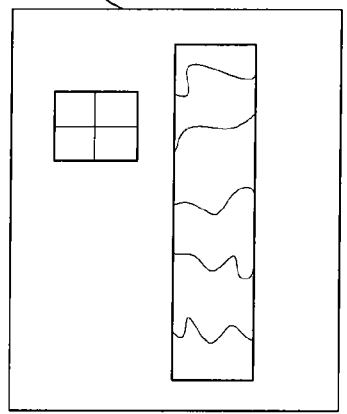
Figure 9C:
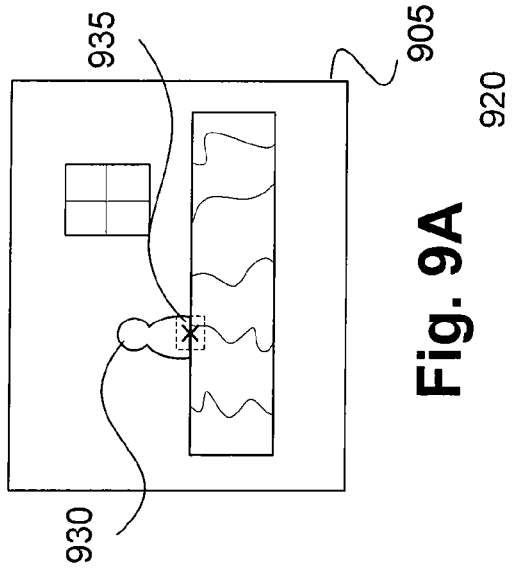

FIG. 9A shows an edge image F(m, n) 905 of a current frame of a video sequence. As seen in FIG. 9A, the current frame has a foreground target (or object) 930. F(m, n)=1 at black edges and F(m, n)=0 at white regions of the image 905. FIG. 9B is the edge image B (m, n) 910 of a background frame in the video sequence. B (m, n)=1 at black edges and B(m, n)=0 at the white regions of the image 910. FIG. 9C shows a suppressed edge image S(m, n) 915 determined from the images 905 and 910 in accordance with Equation (14) as described above.

In accordance with the example of FIGS. 9A to 9C, a footprint is detected at location 935 in the image 905, as seen in FIG. 9A, and the location of the detected footprint is at location 940 in the suppressed edge image 915. A first fixed-size (e.g., 8×8 pixels) image patch at location 935 is extracted from the image 905, and a second fixed-size image patch at location 940 is extracted from the suppressed edge image 915. For the example of FIGS. 9A to 9C, the two extracted patches have similar appearance and similarity score (e.g., normalized cross-correlation) of the two patches is higher than a predetermined threshold (e.g., normalized cross-correlation of 0.6). Therefore, the footprint 935 is filtered out as a false footprint detection.

Figure 9D:
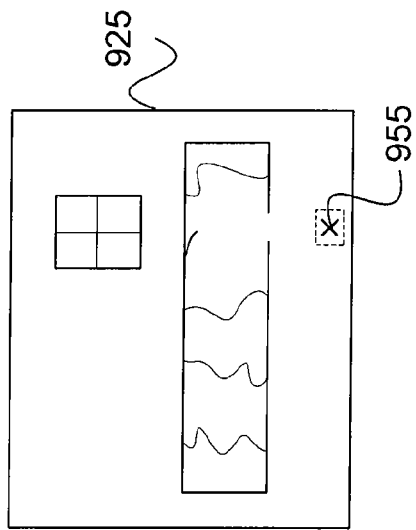
FIGS. 9D, 9E and 9F show images used in another example of false footprint filtering by comparing image patches.

As another example, FIG. 9D shows an edge image F(m, n) 920 of a current frame of a video sequence. The current frame has a foreground target (or object) 945 as seen in FIG. 9D. F(m, n)=1 at black edges and F(m, n)=0 at white regions of the image 920. FIG. 9E again shows the edge image B (m, n) 910 of background frame in the video sequence. B (m, n)=1 at black edges and B (m, n)=0 at white regions of the image 910 as described above. FIG. 9F shows suppressed edge image 925 determined from the images 920 and 910 in accordance with Equation (14) as described above. A footprint 945 is detected at location 950 in the image 920, and the location of the detected footprint is at location 955 in the suppressed edge image 925. A first image patch at location 950 is extracted from the image 920, and a second image patch at location 955 is extracted from image 925.

Figure 9E:
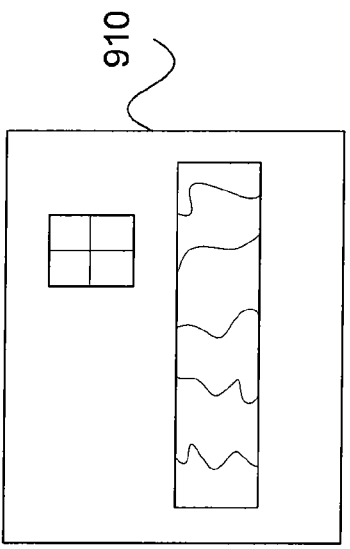
Figure 9F:
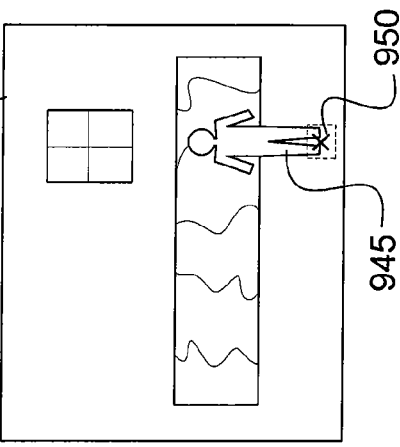

For the example of FIGS. 9D to 9E, the two patches have dissimilar appearance and the similarity score (e.g., normalized cross-correlation) of the two patches is lower and a given threshold (e.g., normalized cross-correlation of 0.6). Therefore, the footprint 945 is confirmed to be a true detection.

As described above, in the method 200, control passes from step 210 to a next step 245, in which a background frame detected (or extracted) in step 210 is segmented into one or more regions. In one arrangement, geodesic superpixel segmentation may be used in step 245 to segment the background image into regions. In another arrangement, watershed segmentation may be used in step 245 to segment the background image into regions.

Figure 3A:
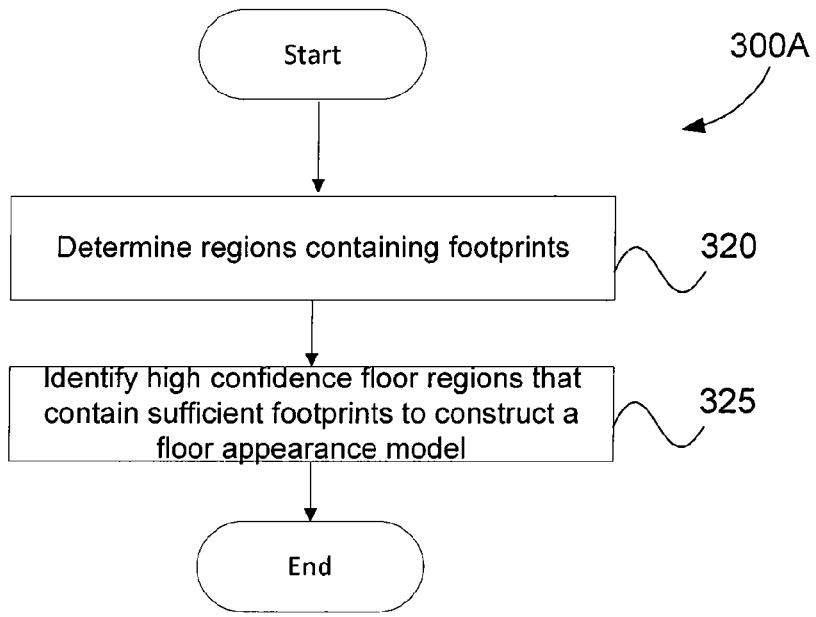
FIG. 3A is a flow diagram showing a method of constructing a floor appearance model, as executed in the method of FIG. 2.

The method 300A of constructing a floor appearance model, as executed at step 255, will now be described with reference to FIG. 3A. The method 300A may be implemented as one or more code modules of the software 133 resident in the ROM 160 of the camera 101 and being controlled in their execution by the processor 105.

The method 300A begins at determining step 320, where the processor 105 is used for determining one or more regions of the image in which a footprint (i.e., a lower part) of any detected target exists. In one arrangement, a list of regions that contain footprints (e.g., the regions that contain white crosses in FIG. 8) is stored in RAM 170 under execution of the processor 105.

Control then proceeds to selecting step 325, where the processor 105 is used for determining a degree of confidence for each of regions determined at step 320. The degree of confidence is used for indicating likelihood of a corresponding region being a floor region (i.e., a supporting surface). One or more of the regions stored in the list may be selected as high confidence floor regions at step 325 based on each corresponding degree of confidence. The degree of confidence for each of the regions may be based on number of footprints detected in each region. For example, high confidence floor regions are regions that contain more footprints than a given threshold. One threshold for the number of footprints in a high confidence floor region may be two (2), for example, when using geodesic superpixels. In the example of FIG. 8, regions 820, 825, 830, 835 and 840 containing at least two (2) footprints are identified as high confidence floor regions.

The high confidence floor regions may be used to construct the floor appearance model at step 325. In one arrangement, an image region (including the extracted high confidence floor region) may be represented using statistical background modelling (e.g., a statistical colour appearance histogram model). In this instance, the floor appearance may be modelled as a multi-modal appearance model. The colour appearance model of each high confidence floor region contributes to one mode in the multi-modal appearance model. Supposing K high confidence floor regions are extracted, the k-th mode, $k=1, \ldots, K$, is modelled as a set of normalized colour histograms, corresponding to marginal distributions of pixel values in each colour channel. The histogram for the c-th channel, $c=1, \ldots, N_c$, where $N_c$ is the number of channels, is $H_{c,k}=\{h_{c,k,b}\}$, where $\Sigma_b h_{c,k,b}=1$, and $b=1, \ldots, B$ ranges over the B histogram bins (e.g., B=16). The overall floor appearance is the set of histograms for all channels of every mode, $H=\{H_{c,k}\}$. In one arrangement, the colour channels correspond to the three channels of YCrCb colour space. In another arrangement, the colour channels correspond to the three channels of the RGB colour space. In yet another arrangement, the colour channels correspond to the single channel of pixel intensity.

Figure 3B:
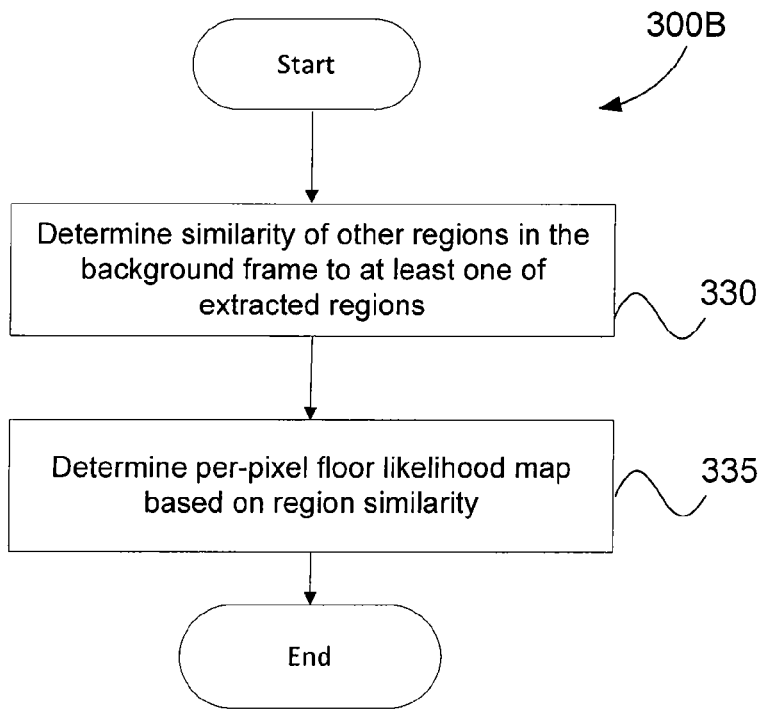
FIG. 3B is a flow diagram showing a method of determining floor region likelihood, as executed in the method of FIG. 2.

The method 300B of determining a floor region likelihood map, as executed at step 260, will be described in detail below with reference to FIG. 3B. The method 300B may be implemented as one or more code modules of the software 133 resident in the ROM 160 of the camera 101 and being controlled in their execution by the processor 105.

The method 300B begins at similarity step 330, where the processor 105 is used for determining similarity of other regions in the background frame of the image to at least one of the identified high confidence floor regions. The high confidence floor regions were determined in accordance with the method 300A as described above. For each image region (for example, the j-th image region) determined at step 245, the colour appearance histogram of the j-th image region $G_{c,j}$ is compared with the colour appearance histogram of every extracted high confidence floor region $H_{c,k}$, $k=1, \ldots, K$. The similarity can be measured as the minimum distance between the normalized colour histogram $G_{c,j}$ of the j-th image region and all modes in the floor appearance model in accordance with Equation (9) as described above.

Control then passes from step 330 to a map determining step 335, where a pre-pixel floor likelihood map is determined based on the region similarity determined in step 330. The floor likelihood map may be used for detecting a floor region (or supporting surface region). In one arrangement, the likelihood function of Equation (10) may be used to map the region similarity to likelihood $L_j$. As described above, the value $L_j$ is proportional to the conditional probability of observing $\hat{d}_j$ given that the j-th image region is a floor region. The floor likelihood map is constructed at step 335 by assigning the likelihood $L_j$ to all pixel locations in the j-th image region. The floor likelihood map for the video sequence input at step 210 may be stored within RAM 180.

Figure 5:
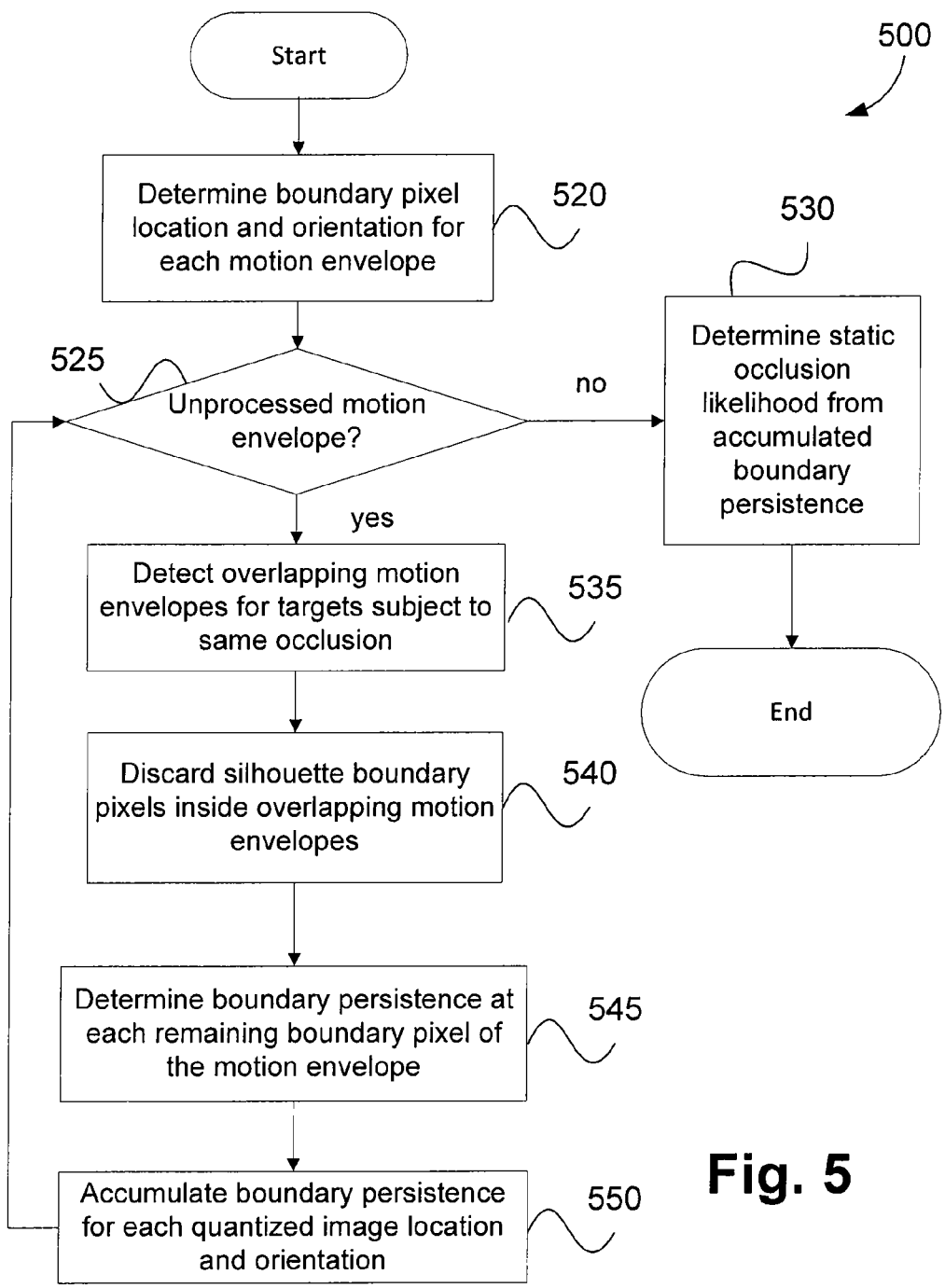
FIG. 5 is a flow diagram showing a method of determining static occlusion likelihood.

The method 500 of determining static occlusion likelihood, as executed at step 230, will now be described in detail with reference to FIG. 5. The method 500 estimates the likelihood of a static occlusion boundary at each pixel location in an image. The method 500 may be used for determining a boundary of an occlusion (or obstacle) which occludes a target. The method 500 may be implemented as one or more code modules of the software 133 resident in the ROM 160 of the camera 101 and being controlled in their execution by the processor 105.

As described above, at target detection and tracking step 210, foreground targets are detected and tracked. As also described above, in one arrangement, such foreground targets are detected by performing foreground separation using a background modelling method such as Mixture of Gaussian (MoG). In another arrangement, a foreground separation method performed on Discrete Cosine Transform blocks may be used at step 210 to generate object positional information.

The foreground target detection is followed by performing object tracking on the detected foreground targets. In one arrangement, the object tracking may be performed using naïve tracking by assuming Brownian motion and associating the nearest neighbour. In still another arrangement, Kalman filtering may be used for foreground target tracking. In still another arrangement, an Alpha-Beta filter may be used for foreground target tracking. In a still further arrangement, the Alpha-Beta filter may use visual information about the target in addition to positional and velocity information.

As described above in relation to FIG. 2, control proceeds from step 210 to step 225, in which motion envelopes are determined. A motion envelope is the union of regions corresponding to one or more foreground targets as described above with reference to FIGS. 6A to 6C.

The method 500, corresponding to step 225, begins at boundary pixel location determination step 520, in which the boundary pixel location and orientation for each motion envelope is determined under execution of the processor 105. For the example of FIG. 6C, in one arrangement, the boundary pixel locations of the envelope 625 are determined by tracing the inner boundary of the envelope 625 (outermost pixels of the envelope). Boundary pixel orientation 635 is determined as the tangent orientation to the boundary of 625 as described below.

In a decision step 525, if there are unprocessed motion envelopes, then the method 500 proceeds to step 535. Otherwise, the method 500 concludes. An unprocessed motion envelope is a motion envelope which is not processed to determine boundary persistence.

In the following steps 535 to 545, the method 500 is used to determine a common pixel location for the edges of the regions formed by the motion envelopes determined at step 225. Silhouette boundaries may represent the edges of regions corresponding to any motion envelopes determined in step 225. The pixel locations where more than one non-interior silhouette boundary is observed represents a common location for the silhouette boundary of a plurality of such motion envelopes. At overlapping detection step 535, overlapping motion envelopes for targets subject to the same occlusion (or obstacle) are detected, under execution of the processor 105. For example, let $F=\{F_i\}$ represent the set of all motion envelopes in a video sequence. Motion envelope $F_i$ is divided into boundary pixels $B_i=\{b_k\}$ (i.e. pixels that are 8-connected to a background pixel) and interior pixels $\overline{B}_i=\{\overline{b}_l\}$ such that $F_i=B_i\cap\overline{B}_i$. The set $\hat{F}_i$ of motion envelopes that overlap $F_i$ is may be represented in accordance with Equation (15), as follows:

$$\hat{F}_i=\{F_j:|F_i\cap F_j|>\rho\max(|F_i|,|F_j|)\forall j\neq i\} \quad (15)$$

where $\rho$ is a minimum overlap ratio threshold. Provided $\rho$ is sufficiently high, $\hat{F}_i$ will generally include overlapping motion envelopes for targets behind the same occlusion as $F_i$. In one arrangement, $\rho=0.37$.

Control passes from step 535 to discarding step 540, where silhouette boundary pixels inside overlapping motion envelopes are discarded. The set of non-interior silhouette boundary pixels $P_i \subseteq B_i$ for detection $F_i$ is determined in accordance with Equation (16), as follows:

$$P_i = \{(p_m, \theta_m) : p_m \in B_i, p_m \notin \overline{B}_j \forall F_j \in \hat{F}_i\} \quad (16)$$

where $p_m$ is the pixel location 630 and $\theta_m$ is the quantized boundary orientation 635, determined as the tangent orientation to the boundary of $F_i$ 625. The directed tangent is defined with $F_i$ on the left (when looking in the direction of the tangent). Boundary orientation thus encodes relative depth of the neighbouring regions, with the closer region (the occluder) on the right side. In one arrangement, $\theta_m$ is quantized into eight (8) orientation bins.

Control passes from step 540 to boundary persistence determination step 545, to determine boundary persistence at each remaining boundary pixel of the motion envelope. The likelihood of persistence $L_i(p_m)$ at each pixel location, $p_m \in P_i$ is measured as the proportion of overlapping motion envelopes that have a boundary at the pixel location (i.e., proportion of overlapping motion envelopes that have a boundary at a common pixel location), and may be determined in accordance with Equation (17), as follows:

$$L_i(p_m) = \frac{1}{|\hat{F}_i|} \sum_{F_j \in \hat{F}_i} \sum_{b_k \in B_j} \delta(p_m, b_k) \quad (17)$$

where $\delta(\cdot, \cdot)$ is the Kronecker delta, and $|\cdot|$ is the cardinality of set $\cdot$.

Control then proceeds to accumulating step 550, where the processor 105 executes the step of accumulating the common pixel locations for the edges of the regions formed by the motion envelopes determined at step 225. In particular, the total likelihood of persistence for each quantized location and orientation is accumulated. The total likelihood of persistence $L(p, \theta)$ for each discrete image location $p$ and quantized orientation $\theta$ may be determined in accordance with Equation (18), as follows:

$$L(p, \theta) = \Sigma_i \Sigma_{(p_m, \theta_m) \in P_i} L_i(p_m) \cdot \delta(p, p_m) \cdot \delta(\theta, \theta_m) \quad (18)$$

As described above, if at decision step 525, there is no unprocessed motion envelope left, then control proceeds to step 530. At step 530, static occlusion likelihood $L(p)$ and orientation maps $\Theta(p)$ are determined from the total likelihood of persistence $L(p, \theta)$, in accordance with Equations (7), as described above.

The occlusion boundary likelihood $L(p)$ and orientation map $\Theta(p)$, determined at step 530 may be stored in RAM 170. For example, as described above with reference to FIGS. 7A to 7C, the occlusion boundary 730 represents the boundary of the occlusion (or obstacle) which occludes the target 721 in the frame 715 and the target 711 in the frame 705. As also described, the boundary pixels 740 represent a common location(s) for the edges of the detected targets 721 and 711. As such, the boundary pixels 740 represent a boundary of the occlusion (or obstacle) 730 comprising a part of the edges of each of the targets 721 and 711 at the common location.

INDUSTRIAL APPLICABILITY

The arrangements described are applicable to the computer and data processing industries and particularly for the described methods.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

What is claimed is:

1. A method of detecting a supporting surface region in an image captured by a camera, said method comprising:
   detecting a foreground object in the image;
   determining one or more background regions of the image in which a lower part of the detected object exists, based on contact between the one or more background regions and the detected object in the image;
   determining a degree of confidence for each of the background regions, the degree of confidence indicating likelihood of a corresponding background region being a supporting surface region, the degree of confidence being based on a number of contacts detected in each region between the foreground object and the one or more background regions;
   selecting one or more of the background regions based on each corresponding degree of confidence;
   determining similarity of other background regions in the image to at least one of the selected background regions; and
   detecting the supporting surface region based on the determined similarity.

2. The method according to claim 1, wherein the object is detected using statistical background modelling.

3. The method according to claim 1, wherein background regions are determined using watershed segmentation.

4. The method according to claim 1, wherein the background regions are determined using geodesic superpixel segmentation.

5. The method according claim 1, wherein the lower part of the object is determined as a lowest point on the object in the image.

6. The method according to claim 1, wherein the lower part of the object is a point closest to a central vertical axis of the object on a strongest intensity edge above a lowest point on the object.

7. The method according to claim 1, wherein the lower part of the object is determined as a point on the object closest to a vertical vanishing point in the image.

8. The method according to claim 1, further comprising filtering false footprints of a further object in the image, the false footprints being determined according to occlusion of the further object.

9. The method according to claim 1, further comprising filtering out false footprints based on comparing patches of the image.

10. The method according to claim 1, wherein false footprints are filtered out using static occlusion likelihood.

11. The method according to claim 1, wherein the similarity is determined based on colour distribution within each region.

12. The method according to claim 1 wherein the contacts are footprints and the number of contacts detected in each region are detected for the image.

13. The method according to claim 1 wherein the contacts are footprints and the number of contacts detected in each region are detected for a number of further images capturing the one or more regions.

14. An apparatus for detecting a supporting surface region in an image captured by a camera, said apparatus comprising:
   a processor; and
   a memory storing instructions that, when executed by the processor, cause the apparatus to:
      detect a foreground object in the image;
      determine one or more background regions of the image in which a lower part of the detected object exists, based on contact between the one or more background regions and the detected object in the image;
      determine a degree of confidence for each of the background regions, the degree of confidence indicating likelihood of a corresponding background region being a supporting surface region, the degree of confidence being based on a number of contacts detected in each region between the foreground object and the one or more background regions;
      select one or more of the background regions based on each corresponding degree of confidence;
      determine similarity of other background regions in the image to at least one of the selected regions; and
      detect the supporting surface region based on the determined similarity.

15. A non-transitory computer-readable storage medium having recorded thereon a computer program for detecting a supporting surface region in an image captured by a camera that, said program comprising:
   code for detecting a foreground object in the image;
   code for determining one or more background regions of the image in which a lower part of the detected object exists, based on contact between the one or more background regions and the detected object in the image;
   code for determining a degree of confidence for each of the background regions, the degree of confidence indicating likelihood of a corresponding background region being a supporting surface region, the degree of confidence being based on a number of contacts detected in each region between the foreground object and the one or more background regions;
   code for selecting one or more of the background regions based on each corresponding degree of confidence;
   code for determining similarity of other background regions in the image to at least one of the selected regions; and
   code for detecting the supporting surface region based on the determined similarity.

16. A system for detecting a supporting surface region in an image captured by a camera, said system comprising:
   a processor; and
   a memory storing instructions that, when executed by the processor, cause the system to:
      detect a foreground object in the image;
      determine one or more background regions of the image in which a lower part of the detected object exists, based on contact between the one or more background regions and the detected object in the image;
      determine a degree of confidence for each of the background regions, the degree of confidence indicating likelihood of a corresponding background region being a supporting surface region, the degree of confidence being based on a number of contacts detected in each region between the foreground object and the one or more background regions;
      select one or more of the background regions based on each corresponding degree of confidence;
      determine similarity of other background regions in the image to at least one of the selected regions; and
      detect the supporting surface region based on the determined similarity.

* * * * *